United States Patent
Smit et al.

(10) Patent No.: US 11,118,244 B2
(45) Date of Patent: Sep. 14, 2021

(54) LOW ACIDITY, LOW SOLIDS PRESSURE OXIDATIVE LEACHING OF SULPHIDIC FEEDS

(71) Applicant: Sherritt International Corporation, Fort Saskatchewan (CA)

(72) Inventors: Jan Tjeerd Smit, St Albert (CA); Preston Carl Holloway, Edmonton (CA)

(73) Assignee: Sherritt International Corporation, Fort Saskatchewan (CA)

( * ) Notice: Subject to any disclaimer, the term of this patent is extended or adjusted under 35 U.S.C. 154(b) by 594 days.

(21) Appl. No.: 15/951,615

(22) Filed: Apr. 12, 2018

(65) Prior Publication Data

US 2018/0298466 A1 Oct. 18, 2018

Related U.S. Application Data

(60) Provisional application No. 62/485,607, filed on Apr. 14, 2017.

(51) Int. Cl.
*C22B 15/00* (2006.01)
*C22B 3/44* (2006.01)
(Continued)

(52) U.S. Cl.
CPC ........ *C22B 15/0076* (2013.01); *B01D 11/028* (2013.01); *B01D 11/0257* (2013.01);
(Continued)

(58) Field of Classification Search
CPC ................. C22B 11/08; C22B 15/0071; C22B 15/0063–0093
See application file for complete search history.

(56) References Cited

U.S. PATENT DOCUMENTS

| 2,686,114 A | 8/1954 | McGauley et al. |
| 3,637,371 A | 1/1972 | Mackiw et al. |

(Continued)

FOREIGN PATENT DOCUMENTS

| CA | 2032357 A1 | 6/1992 |
| CN | 1204277 C | 6/2005 |

(Continued)

OTHER PUBLICATIONS

International Preliminary Report on Patentability, dated Oct. 24, 2019, corresponding to International Application No. PCT/CA2018/000071 (filed Apr. 10, 2018), 6 pp.

(Continued)

*Primary Examiner* — Anthony J Zimmer
*Assistant Examiner* — Sean P. O'Keefe
(74) *Attorney, Agent, or Firm* — Leydig, Voit & Mayer, Ltd.

(57) ABSTRACT

Process for recovering one or both of copper and silver from a sulphidic feed containing iron, arsenic, copper and silver by pressure oxidizing an aqueous feed slurry of the sulphidic feed in a pressure vessel to form a liquid phase containing free sulphuric acid and aqueous copper sulphate, and to precipitate arsenic as solid iron arsenic compounds. The process includes operating the pressure vessel at a sufficiently low solids content to maintain a free acid level below 30 g/L in the liquid phase, and providing sufficient heat to maintain a temperature in the pressure vessel above 200° C. Copper metal is recovered from the liquid phase and/or silver may be recovered from the solids by cyanide leaching without the need for a jarosite destruction step.

25 Claims, 17 Drawing Sheets

(51) Int. Cl.
*C22B 11/08* (2006.01)
*C22B 1/11* (2006.01)
*C22B 3/04* (2006.01)
*C22B 11/00* (2006.01)
*C22B 3/24* (2006.01)
*B01D 11/02* (2006.01)

(52) U.S. Cl.
CPC ............ *B01D 11/0288* (2013.01); *C22B 1/11* (2013.01); *C22B 3/04* (2013.01); *C22B 3/24* (2013.01); *C22B 3/44* (2013.01); *C22B 11/04* (2013.01); *C22B 11/08* (2013.01); *C22B 15/0071* (2013.01)

(56) References Cited

U.S. PATENT DOCUMENTS

| | | | |
|---|---|---|---|
| 3,917,519 | A | 11/1975 | Fisher et al. |
| 3,962,402 | A | 6/1976 | Touro |
| 4,149,880 | A | 4/1979 | Prater et al. |
| 4,244,734 | A | 1/1981 | Reynolds et al. |
| 4,571,264 | A | 2/1986 | Weir et al. |
| 4,610,723 | A | 9/1986 | Nogueira et al. |
| 5,071,477 | A | 12/1991 | Thomas et al. |
| 5,458,866 | A | 10/1995 | Simmons |
| 5,698,170 | A | 12/1997 | King |
| 5,895,633 | A | 4/1999 | King |
| 6,251,163 | B1 | 6/2001 | King |
| 6,451,088 | B1 | 9/2002 | Marsden et al. |
| 6,451,089 | B1 | 9/2002 | Marsden et al. |
| 6,497,745 | B2 | 12/2002 | Marsden et al. |
| 6,626,979 | B2 | 9/2003 | Marsden et al. |
| 6,641,642 | B2 | 11/2003 | Simmons et al. |
| 6,663,689 | B2 | 12/2003 | Marsden et al. |
| 6,676,909 | B2 | 1/2004 | Marsden et al. |
| 6,680,034 | B2 | 1/2004 | Marsden et al. |
| 6,755,891 | B2 | 6/2004 | Jones |
| 6,890,371 | B2 | 5/2005 | Marsden et al. |
| 6,893,482 | B2 | 5/2005 | Marsden et al. |
| 6,972,107 | B2 | 12/2005 | Marsden et al. |
| 7,041,152 | B2 | 5/2006 | Marsden et al. |
| 7,125,436 | B2 | 10/2006 | Marsden et al. |
| 7,341,700 | B2 | 3/2008 | Marsden et al. |
| 7,462,272 | B2 | 12/2008 | Marsden et al. |
| 7,473,413 | B2 | 1/2009 | Marsden et al. |
| 7,476,308 | B2 | 1/2009 | Marsden et al. |
| 7,485,216 | B2 | 2/2009 | Marsden et al. |
| 7,517,384 | B2 | 4/2009 | Marsden et al. |
| 7,604,783 | B2 | 10/2009 | King et al. |
| 7,666,371 | B2 | 2/2010 | Marsden et al. |
| 7,713,500 | B2 | 5/2010 | Johnson |
| 7,722,756 | B2 | 5/2010 | Marsden et al. |
| 7,736,475 | B2 | 6/2010 | Sandoval et al. |
| 7,736,476 | B2 | 6/2010 | Gilbert et al. |
| 7,736,486 | B2 | 6/2010 | Stevens et al. |
| 7,736,487 | B2 | 6/2010 | Marsden et al. |
| 7,736,488 | B2 | 6/2010 | Marsden et al. |
| 8,012,318 | B2 | 9/2011 | Marsden et al. |
| 8,016,983 | B2 | 9/2011 | Stevens et al. |
| 8,029,751 | B2 | 10/2011 | King et al. |
| 8,187,450 | B2 | 5/2012 | Sandoval et al. |
| 8,252,254 | B2 | 8/2012 | Choi et al. |
| 8,273,237 | B2 | 9/2012 | Marsden et al. |
| 8,420,048 | B1 | 4/2013 | Raman et al. |
| 8,491,701 | B2 | 7/2013 | Uhrie et al. |
| 8,623,115 | B2 | 1/2014 | Langhans, Jr. et al. |
| 9,194,023 | B2 | 11/2015 | Wang et al. |
| 2005/0188791 | A1* | 9/2005 | Seeley .............. C22B 15/0071 75/743 |
| 2008/0173132 | A1 | 7/2008 | Dunn et al. |
| 2008/0286180 | A1* | 11/2008 | Jones .............. C22B 15/0069 423/30 |
| 2009/0019970 | A1 | 1/2009 | Ritchie et al. |
| 2009/0293680 | A1 | 12/2009 | Rithchie et al. |
| 2015/0123030 | A1 | 5/2015 | Conner et al. |
| 2017/0009318 | A1 | 1/2017 | Buban et al. |

FOREIGN PATENT DOCUMENTS

| | | |
|---|---|---|
| WO | WO 96/07762 A1 | 3/1996 |
| WO | WO 02/20855 A2 | 3/2002 |
| WO | WO 2014/122363 A1 | 8/2014 |

OTHER PUBLICATIONS

Bruce et al., "Unlocking Value in Copper Arsenic Sulphide Resources with the Copper-Arsenic CESL Technology", Hydro-Copper Conference Proceedings, 2011 (cesl.com, accessed Oct. 28, 2014).
Bruckard et al., "Gold and silver extraction from Hellyer lead-zinc flotation middlings using pressure oxidation and thiourea leaching", *Hydrometallurgy*, 33:(1-2): 17-41 (1993).
Collins et al., "Design of the AGA Brasil Refractory Gold Pressure Oxidation Plant," 51$^{st}$ Annual Conference of Metallurgist of CIM, Pressure Hydrometallurgy 2012, Niagara, Canada, pp. 3-14 (2012).
Collins, et al., "Pilot Plant Pressure Oxidation of Refractory Gold-Silver Concentrate" *CIM Journal*, vol. 4, No. 3 (2013).
Dutrizac, "Converting Jarosite Residues into Compact Hematite Products", *JOM*, pp. 36-39 (Jan. 1990).
Environmental Protection Agency Publication, "Test Methods for Evaluating Solid Waste Physical/Chemical Methods," Method 1311, "Toxicity Characteristic Leaching Procedure", SW-846, Revision 6, (Feb. 2007).
Ferron et al., "Copper Arsenide as a Sustainable Feedstock for the Copper Industry," *SGS Mineral Services, Technical paper*, pp. 1-6 (2003).
Fleming, "Basic Iron Sulphate—A Potential Killer for Pressure Oxidation Processing of Refractory Gold Concentrates if not Handled Appropriately," *SGS Minerals Services*, Technical Paper Jun. 2009, pp. 1-10. (2009).
Geldart et al., "Aqueous pressure oxidation as a waste treatment process—stabilizing roaster wastes", *Hydrometallurgy*, 30:29-44 (1992).
Gomez et al., "Hydrothermal reaction chemistry and characterization of ferric arsenate phases precipitated from $Fe_2(SO4)_3$—$As_2O_5$—$H_2SO_4$ solutions", *Hydrometallurgy*, 107:74-90 (2011).
Marsden et al., "Hydrometallurgical Processing of Copper Concentrates by Phelps Dodge at the Bagdad Mine in Arizona," Presented at ALTA Copper 2003, Perth, Australia (May 22-23, 2003).
Riveros et al., "Arsenic Disposal Practices in the Metallurgical Industry", *Canadian Metallurgical Quarterly*, 40(4):395-420 (2001).
Canadian Intellectual Property Office, International Search Report and Written Opinion in International Application No. PCT/CA2018/000071 (dated Aug. 1, 2018), 8 pgs.
Chilean Opposition by Third Party, dated May 12, 2020, corresponding to Chilean Patent Application No. 201902915, 12 pages.
Riveros (2015) "Cinética de la lixiviación a presión de enargita en medio $FeSO_4$—$H_2SO_4$—$O_2$," Doctoral Thesis, University of Conception, Chile: 322 pages.
Wünkhaus (Nov. 9, 2020) "Response to Opposition," corresponding to Chilean Patent Application No. 201902915, 27 pages.

* cited by examiner

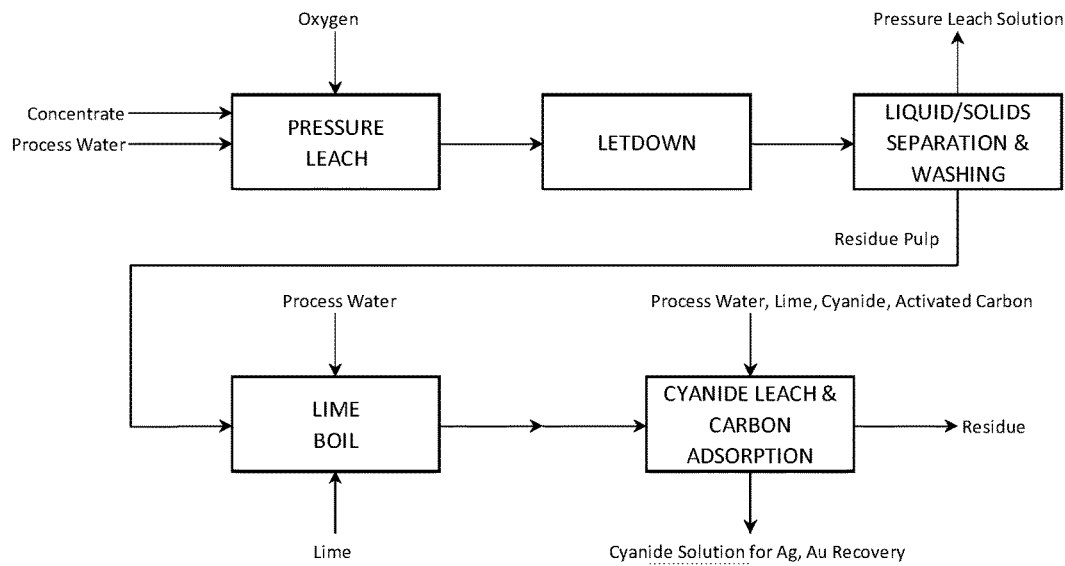
Fig. 1 – Prior Art
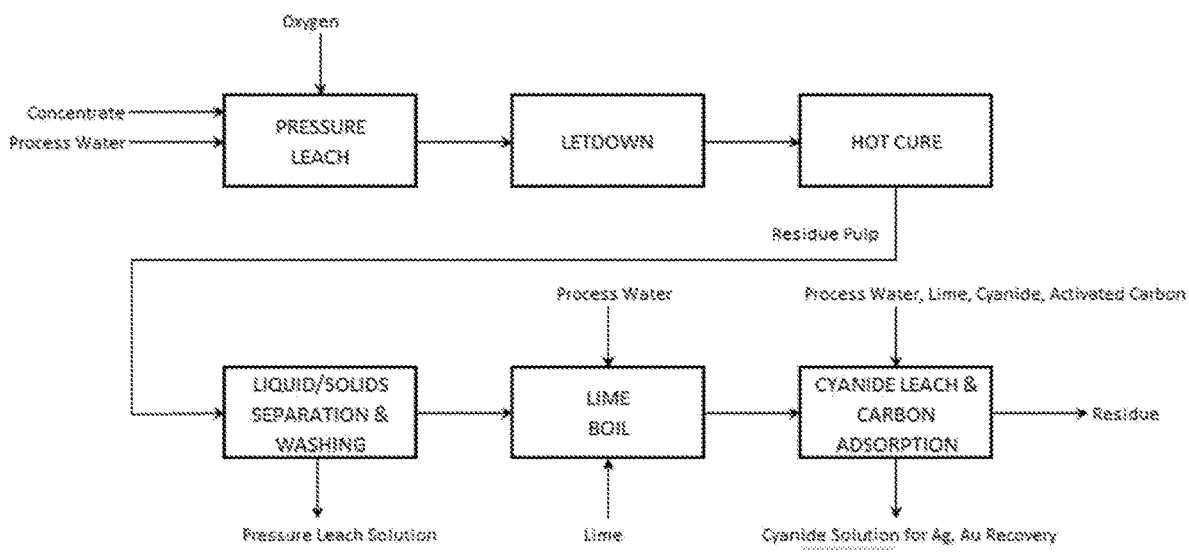
Fig. 2 – Prior Art

LOW ACIDITY, LOW SOLIDS PRESSURE OXIDATIVE LEACHING OF SULPHIDIC FEEDS

CROSS REFERENCE TO RELATED APPLICATIONS

This application claims priority from U.S. Provisional Patent Application No. 62/485,607, filed Apr. 14, 2017, which is incorporated by reference herein to the extent that there is no inconsistency with the present disclosure.

TECHNICAL FIELD

This disclosure generally relates to a process for recovering copper and/or silver from a sulphidic feed by pressure oxidative leaching. In some embodiments the disclosure relates to the processing of a copper sulphidic feed containing appreciable iron, arsenic and silver.

BACKGROUND

Sulphidic ores and concentrates are typically processed by smelting or hydrometallugical processes to recover non-ferrous metals such as copper. As the sulphidic ores and concentrates available are of a steadily lower quality, with higher levels of contaminants, hydrometallurgical processes such as pressure oxidative leaching (PDX) are generally becoming competitive over methods such as smelting due to the environmental issues associated with smelting sulphide concentrates. The term "quality" refers to contaminants such as As, Hg, Sb and Bi, as well as the concentration of copper and sulphide sulphur in the ore or concentrate. With ever tightening environmental emission standards, lower quality concentrates impose a significant strain on the off-gas handling facilities in smelting operations, while import/export restrictions on such ore or concentrates currently make it difficult to export concentrates with an arsenic concentration greater than 0.5 wt %. Thus, for arsenical complex concentrates having greater than 0.5 wt % As, pressure oxidative leaching can be considered.

In general, pressure oxidation involves subjecting a slurry including the ore or concentrate feed to elevated pressure and temperature in the presence of oxygen in a pressure vessel to decompose the minerals. The sulphide components of the ore are at least partially oxidized, liberating metals. The metals can then be recovered from the solids and/or from the liquid phase, or pregnant leach solution (PLS) of the treated slurry.

Sulphidic ores or concentrates containing commercially appreciable amounts of precious metals such as gold or silver may be processed by pressure oxidative leaching. While the gold recovery from such feeds is generally acceptable, the silver can be difficult to recover in an economically feasible manner. When the sulphidic concentrates contain appreciable amounts of iron and arsenic, and the amounts of both copper and silver are at commercially appreciable levels, it is particularly difficult to manage the pressure oxidative leaching process in a manner that produces environmentally stable residues, while also recovering both the copper and silver values in high yields. The formation of sulphate bearing solid phases in the pressure leach residue, in particular silver jarosites, copper arsenates and basic ferric arsenate sulphate (BFAS) is believed to be a major cause of these problems. Once silver is associated with a jarosite compound, the silver is difficult to recover in an economical manner. The silver associated with these jarosites is extremely refractory to cyanide leach treatment in a typical post-PDX silver recovery process, with the result that silver extractions are very low unless a costly post-treatment of the pressure leach residue takes place.

Dutrizac (Converting Jarosite Residues into Compact Hematite Products, JOM, January 1990) recommends temperatures greater than 220° C. and low initial acid and ferric concentrations to decompose jarosites, but this decomposition is found to be slow and therefore of limited, if any, commercial value. Collins et al. (Pilot Plant Pressure Oxidation of Refractory Gold-Silver Concentrate, CIM Journal, Vol. 4, No. 3, 2013) describe the treatment of pressure leach residues by the "lime boil" process, before cyanide leaching, and its necessity to subsequent silver recovery. Choi et al., (U.S. Pat. No. 8,252,254) describe a process of "hot curing" and "lime boil" to decompose basic ferric sulphates and argentojarosites for the recovery of silver from pressure leach residues.

After being treated by lime boil and cyanide leaching, process residues may fail the TCLP tests for environmental stability. This is believed to be due to the reaction of basic ferric arsenate sulphate (BFAS) with lime to produce gypsum, ferric hydroxide, calcium arsenate, and/or less stable iron arsenates.

One approach for eliminating the need for a lime boil step, while achieving higher silver recoveries is set out in U.S. Pat. No. 6,641,642 to Newmont USA Limited. The process is designed for gold/silver sulphide concentrates. Free acid concentration in the autoclave is controlled between 12 and 33 g/L by the addition of limestone directly to the autoclave. The resulting solids are then amenable to silver recovery by direct cyanidation, i.e., without a jarosite decomposition step. Some disadvantages of the Newmont process include the cost of limestone for acid neutralization, reduced oxygen utilization in the PDX step because of the $CO_2$ released in the autoclave with the limestone, the need to process a higher solids content in the residue from the autoclave, and scaling in the autoclave due to calcium sulphate formed by reaction with the limestone, leading to a requirement for more frequent shutdowns and/or autoclave downtime. Still further, if the Newmont process were applied to arsenical copper feeds, which is not disclosed, the process would have the added disadvantage of neutralizing a significant amount of the acid generated during pressure leaching, thus reducing the quantity of acid that can be used in other operations, such as in a copper oxide heap leach process.

Processing arsenical copper feeds by pressure oxidative leaching can lead to the formation of copper and/or copper-iron arsenates. Once formed, these compounds are stable under the prevailing pressure leach conditions of temperature and acidity, but break down under lime boil conditions, potentially releasing a significant amount of soluble copper in cyanidation, which leads to a correspondingly high cyanide consumption. The copper values may be recovered prior to disposal of the cyanidation solution or residues, as part of a cyanide recovery and regeneration process, such as the SART (Sulphidisation, Acidification, Recycling and Thickening) process. However, the presence of high levels of copper in cyanidation also limits the process choices for silver recovery as the copper increases reagent requirements and/or contaminates the silver product produced.

In a recent patent application assigned to Sherritt International Corporation (US Patent Publication No. 2017/009318, published Jan. 12, 2017), a copper recovery process is disclosed for feeds containing iron, copper and arsenic. To lessen arsenic re-dissolution and to maintain stability of the solid iron arsenic compounds formed during pressure oxidative leaching, the treated slurry exiting the autoclave is controlled for temperature, free acid level and/or residence time, and the Fe:As molar ratio for the pressure oxidative leaching step is preferably maintained at greater than 4:1. Thus, the process introduces limits to the amount of arsenic that can be treated, per unit autoclave volume, and the range of feeds that can be treated. The patent application does not address silver recovery if the feed includes commercially appreciable amounts of silver.

SUMMARY OF THE INVENTION

Broadly stated, a process is provided for recovering one or both of copper and silver from a sulphidic feed containing iron, arsenic, copper and silver. The process includes:

a) pressure oxidizing an aqueous feed slurry of the sulphidic feed in a pressure vessel to form a liquid phase containing free sulphuric acid and aqueous copper sulphate, and to precipitate arsenic as solid iron arsenic compounds, while operating the pressure vessel at a sufficiently low solids content to maintain a free acid level below 30 g/L in the liquid phase, and while providing sufficient heat to maintain a temperature in the pressure vessel above 200° C.;

b) withdrawing from the pressure vessel treated slurry comprising a liquid phase containing sulphuric acid and copper sulphate, and solids containing iron arsenic compounds and at least a portion of the silver;

c) separating the liquid phase from the solids; and one or both of d) recovering copper from the separated liquid phase; and e) recovering silver from the solids by cyanide leaching without the need for a jarosite destruction step after step a).

As used herein and in the claims, the terms and phrases set out below have the following definitions.

"Aqueous feed slurry", or "feed pulp", is used herein to refer to the combined feed to the pressure oxidative leaching step, and includes all process liquids, such as process water and any steam added to the pressure vessel which condenses in the pressure vessel, and all solids added to the pressure vessel.

"Commercially appreciable" as used herein to denote amounts of valuable metals, such as copper and/or silver metals, indicates that the metal is present in the sulphidic feed to the pressure oxidative leaching step in amounts which are economically sufficiently significant to warrant recovery from the feed. Commercially appreciable amounts that can be economically recovered in any process are dependent on the market prices for the metal, the capital and operating costs of the process, and the economic considerations for the location of the mine and/or processing plant. For example, under current metal prices and economic conditions, feeds having less than 10% copper and/or less than 100 g/t silver are generally considered to have less than commercially appreciable amounts of copper and silver respectively.

"Free acid level" refers to the concentration of $H_2SO_4$ in solution in the pressure oxidative leaching step, such as measured at discharge from the autoclave. The standard used to measure free acid level is conducted at room temperature (20° C.) by titrating of an aliquot of acidic solution with sodium carbonate solution to pH 3.5. Before performing this titration, potassium iodide is added to the solution to react with ferric iron ($Fe^{3+}$), which may hydrolyze and interfere with the $H_2SO_4$ titration, and sodium thiosulphate solution is added to react with any iodine ($I_2$) that is formed. The reactions involved in this determination are provided below:

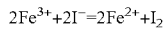
$$2Fe^{3+}+2I^-=2Fe^{2+}+I_2$$

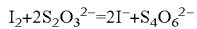
$$I_2+2S_2O_3^{2-}=2I^-+S_4O_6^{2-}$$

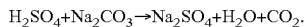
$$H_2SO_4+Na_2CO_3 \rightarrow Na_2SO_4+H_2O+CO_2.$$

"Solids content" or "solids" as used herein with reference to the total solids in the pressure vessel during the pressure oxidative leaching step, is the fraction of the solids in the aqueous feed slurry, expressed as a percent by weight.

"Stability" or "stable" as used herein with reference to arsenic residue stability or the stability of solid iron arsenic compounds formed in pressure oxidative leaching, refers to maintaining the environmental stability of the arsenic solids that have been formed in the pressure oxidative leaching step and in the process steps subsequent to pressure oxidative leaching, and refers to the environmental stability as measured by the standard Toxicity Characteristic Leaching Procedure (TCLP). TCLP is a testing methodology for waste materials, with protocols set by the Environmental Protection Agency (EPA) in the United States, and other countries, see Environmental Protection Agency Publication SW-846, "Test Methods for Evaluating Solid Waste, Physical/Chemical Methods", Method 1311, "Toxicity Characteristic Leaching Procedure", Revision 6, February 2007. The current limit for arsenic in the TCLP leachate in the United States is 5 mg/L, (see Code of Federal Regulations, Title 40, Vol. 27, Section 261.24, Jul. 1, 2012). Solid iron arsenic compounds that are more stable than the regulatory limit (i.e., the arsenic concentration in TCLP leachate is less than 5 mg/L) can be formed in the pressure oxidative leaching step. Thus, "stable solids" as used herein refers to the stability of these solids, as measured by TCLP, from after pressure oxidation until after the solids are separated from the acidic leach solution, and after any subsequent cyanidation step.

BRIEF DESCRIPTION OF THE DRAWINGS

FIGS. 1 and 2 are schematic flow diagrams showing known pressure oxidative leach processes for metal recovery from sulphidic feed concentrates containing appreciable amounts of base metals such as copper, and/or precious metals, such as gold and/or silver.

DETAILED DESCRIPTION

Figure 3:
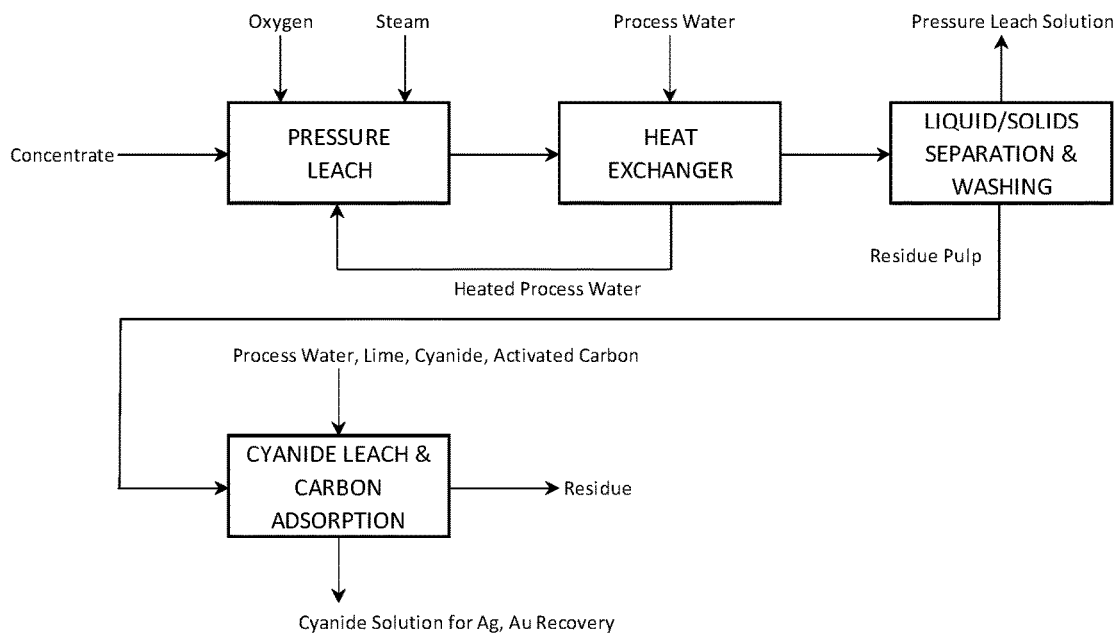
FIGS. 3-7 are flow diagrams showing embodiments for pressure oxidative leaching in accordance with the process of this disclosure.

Exemplary embodiments for the process of this disclosure are shown in FIGS. 3-7, with copper being recovered from the pregnant leach solution (PLS) from a low solids, low acidity pressure oxidative leaching step, and precious metals such as Au or Ag being recovered from the solids (residue pulp), by cyanide leaching without an intervening lime boil step to destroy jarosites, and without the need to neutralize acid produced in the pressure leach. This is contrasted with the standard process for recovering copper in the presence of arsenic and with one or more precious metals such as Au or Ag, as shown in FIGS. 1 and 2. The processes of FIGS. 1 and 2 show standard operation of the autoclave with the solids content of the feed being sufficient to operate the autoclave autothermally with ambient process quench water (i.e., below about 50° C.), and involving a jarosite destruction step after the pressure leach, and before the cyanidation step, in the form of a lime boil. The processes of FIGS. 1 and 2 are consistent with processes described in the above Background section.

The process is generally described herein and below for sulphidic ore or concentrates containing iron and arsenic, with commercially appreciable amounts of both copper and silver, both of which are to be recovered, however, it should be understood that, on the basis of the experimental work and results set out herein, the process also has application to sulphidic feeds containing commercially appreciable amounts of silver, without significant copper and/or arsenic, and to sulphidic feeds containing commercially appreciable amounts of copper with arsenic in amounts greater than 0.5 wt %, but without significant silver.

According to some embodiments of the process, an arsenical sulphide concentrate or ore that contains copper, and/or silver in commercially appreciable amounts, is treated in a dilute (i.e., low solids) pressure oxidative leach step, with additional heat being added to the pressure oxidative leach step, to maintain the temperature above 200° C. The solids content, while varying with the sulphide content in the feed, is sufficiently low to maintain the free acid level formed in the liquid phase in the pressure oxidative leaching step below 30 g/L $H_2SO_4$, for example below 27 g/L or below 25 g/L, for example between about 5 and 25 g/L. This low level of solids in the pressure vessel for most sulphidic feeds provides, through reaction in the vessel, less than about 60% of the heat required to maintain the temperature of the pressure vessel at or above 200° C. In comparison, for a standard pressure oxidative leach step, the solids provide essentially 100% of the heat required to maintain the temperature of the pressure vessel at or above 200° C. Additional heat is thus added to the pressure vessel, as shown in the exemplary embodiments of FIGS. 3-7.

The process feed to the process may include one or more feed components, in separate or combined process feed to the autoclave. The sulphidic feed typically contains copper and/or silver in commercially appreciable amounts, with iron and arsenic in varying amounts. Examples of sulphidic feed and other feed components to the pressure oxidative leaching vessel include:

i. Arsenical copper ores or concentrates containing sulphide minerals and optionally containing silver, for example copper-containing sulphide ore or concentrate;

ii. Silver ores or concentrates containing sulphide minerals and optionally containing other precious metals such as gold, and optionally also containing copper; and iii. Arsenical materials generated from pyrometallurgical treatment of sulphides, such as one or both of roaster dust and a roaster calcine from a pyrometallurgical treatment of a copper ore or concentrate, or process water containing arsenic.

A process solution, typically an aqueous solution, is added with the process feed to form an aqueous feed slurry. The process solution (process water) may be added separately from the process feed, or one or more of the feed components may be combined with, or slurried with, the process solution. The process solution may include process water and/or solutions containing arsenic in dissolved form. The process water may contain dissolved salts. The addition of process solution is a convenient way to control the operating temperature of an industrial autoclave.

The pressure oxidative leaching is conducted in a pressure vessel, such as a high pressure autoclave, with oxygen at high temperature and high pressure conditions, as is generally known in the industry. The autoclave may include one or more compartments fitted for agitation and addition of aqueous process solution and oxygen. A multi-compartment autoclave acts as a series of continuous stirred tank reactors with slurry transferring to successive compartments by overflow.

In some embodiments the following conditions for the operating of the pressure oxidative leaching step are found to produce favourable results:

i. Temperature of 200 to 230° C., preferably 210 to 230° C.;

ii. Oxygen partial pressure of 200 to 1000 kPa, preferably about 500 kPa; and iii. Retention time of 20 to 120 minutes, preferably 20 to 60 minutes.

With the low solids content controlling free acid in the pressure leaching step below 30 g/L, for example below 27 g/L, below 25 g/L, or between about 5-25 g/L, the pressure leaching step proceeds without the need for neutralizing free acid produced in the autoclave, and without the need for neutralizing and/or diluting free acid in steps subsequent to the pressure leaching.

Figure 4:
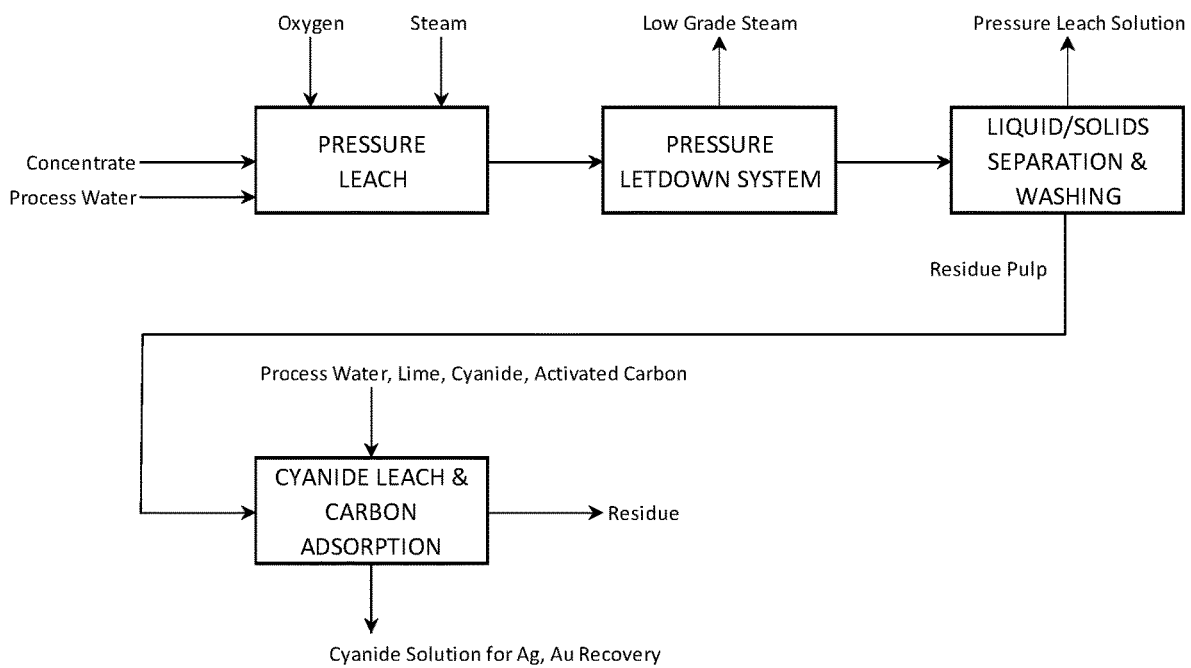
Figure 5:
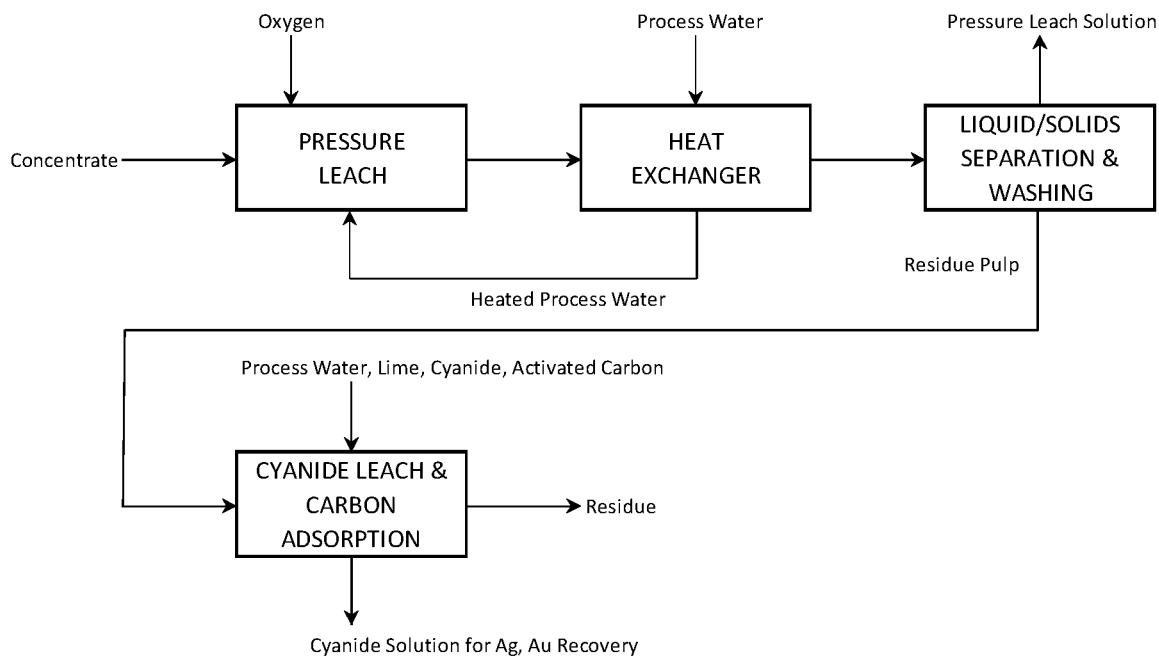
Figure 6:
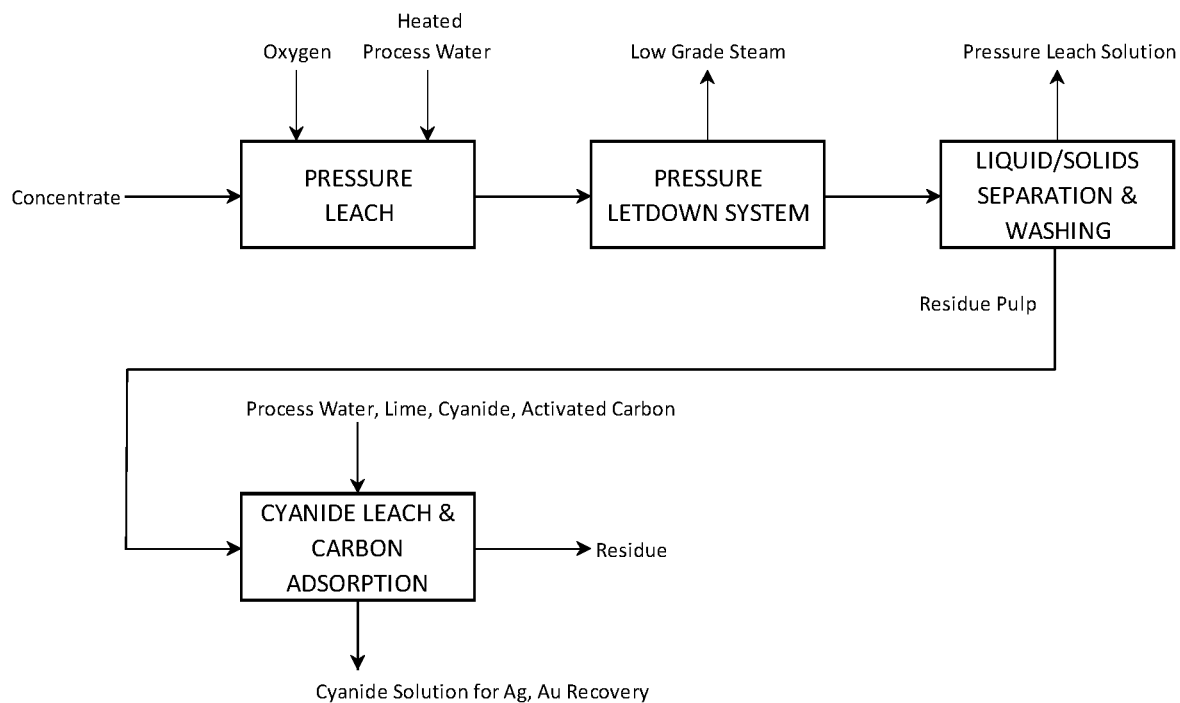
Figure 7:
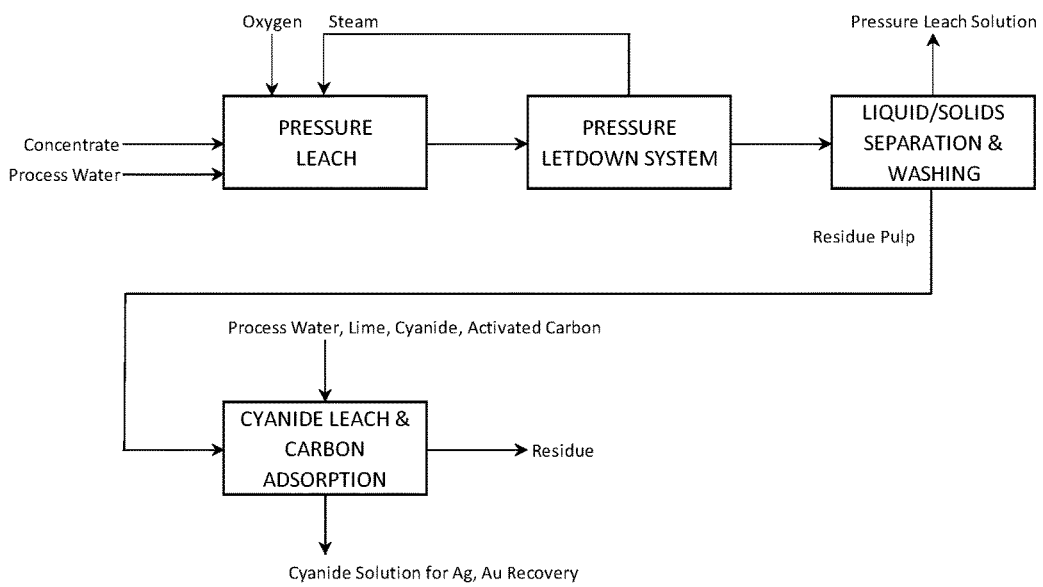

In the embodiment of FIG. 3, heated process water and steam are added to the autoclave. To heat the process water, a heat exchanger (direct or indirect) recovers heat from the treated slurry leaving the autoclave. In the embodiment of FIG. 4, the process water is not heated, but steam is added to the autoclave, and low grade steam is recovered in a pressure letdown system as the treated slurry leaves the autoclave. In the embodiment of FIG. 7, the steam from the pressure letdown system is added to the autoclave. In the embodiment of FIG. 5, no steam is used in the process, but a heat exchanger is used to recover heat from the treated slurry as it exits the autoclave in order to treat the process water to the autoclave. In the embodiment of FIG. 6, process water is heated by other sources and fed to the autoclave, while steam is recovered during the pressure letdown system. In still other embodiments, the concentrate may be slurried with process water before being added to the autoclave, and heat from the pressure letdown and/or a heat exchanger may be used to heat the process water. Alternatively, the autoclave may be directly heated. The particular choice or configuration for adding heat to the dilute pressure oxidative leaching step will vary for each industrial operation, and will depend on the availability of additional heat sources from other operations and on the degree of retrofitting that can be accommodated in an existing industrial set-up. Arrangements allowing for heat recovery to heat the process water are highly preferred so that negligible additional heating is needed.

Liquid-solid separation may be accomplished by a number of different methods, including thickening, filtration, centrifuging or hydrocycloning, or a combination of these methods. Washing of the solid residues is preferably employed in this step to help recover soluble copper values, such as in a countercurrent decantation wash (CCD) thickening circuit or a series of belt and/or pressure filters.

Silver, and other precious metals such as gold, may be recovered from the solid residues from the liquid-solid separation and washing step by direct cyanidation, without an intervening jarosite destruction step such as a lime boil step. The techniques for the cyanide leach step, and for the subsequent recovery of silver and gold from the cyanide solution, are well known in the industry.

Copper may be recovered from the concentrated copper solution obtained from the liquid-solid separation and washing step, for example using solvent extraction, which is typically accomplished using one of several commercially available oxime reagents (e.g. Acorga™ or LIX™). Two different exemplary solvent extraction configurations are set out below, depending on the overall copper recovery flowsheet for a given operating site.

The copper solution derived from pressure leaching can be treated directly in a standalone solvent extraction circuit. Neutralization of a portion of the free acid in the copper pressure leach solution may be performed, depending on the acid concentration of the copper solution and the solvent extraction reagent being used. Alternatively, the copper solution derived from pressure leaching may be combined with heap leach solutions from a heap leaching operation in close proximity. The heap leaching solution optionally may be combined with the pressure leach solution before copper recovery by solvent extraction, leaving a solution with useful acid content.

The solvent extraction reagent is stripped with spent electrolyte to produce loaded electrolyte for copper recovery as copper cathode in electrowinning.

Raffinate from the solvent extraction circuit contains all or a portion of the free acid values from the pressure leach solution; the acid associated with the copper loaded onto the solvent extraction reagent; the remaining copper that was not loaded in solvent extraction; and essentially all of the arsenic present in the solution from the liquid solid separation step.

The acid in the raffinate may be used for heap leaching of copper oxides or copper sulphide ores to produce a copper-containing leach solution for subsequent recovery in solvent extraction. A portion of the leach solution generated from heap leaching with this raffinate solution may need to be treated to bleed arsenic from solution to prevent it from building up to unacceptable levels in the heap leach solutions.

Froth flotation can be used to improve overall copper and/or silver recovery. Froth flotation is well known in the minerals industry as a method in which air bubbles are incorporated into a mineral slurry to selectively separate hydrophobic materials from hydrophilic materials. The hydrophobic minerals are collected with the resulting "froth" and the hydrophilic materials remain behind in the mineral slurry. For the pressure leach residue from this process, unleached, residual sulphides that may be present in the pressure leach residue can be selectively recovered from the oxide and gangue minerals present in the residue using froth flotation to produce a copper and/or silver concentrate. This copper/silver concentrate can be treated for copper and silver recovery in a copper smelter.

In contrast to the processes described in the Background section, which target solids content for autothermal operation with quench water at ambient temperature (e.g., less than 50° C.), the dilute pressure leach process of this disclosure operates the pressure leaching unit at a solids content selected on the basis of metal(s) extraction and/or residue stability, and with the addition of heat, for example to preheat the process water, or a portion of the process water, being used for temperature control in the autoclave. In prior industrial operation of pressure leaching, the quench water requirements and/or heat recovery systems are considered only in terms of energy savings and/or capital savings in the design of the temperature and pressure letdown systems. However, in some embodiments in the present disclosure, the pressure oxidative leach process is operated with low solids content, low acidity and quench water heating in order to modify the nature of the solids precipitated (for example to form and maintain stable solids), and to favourably modify the chemistry of the pressure leaching step, and to decrease the formation of solid residual sulphate bearing phases.

Without being bound by the same, it is believed that sulphate bearing solid phases in a leach residue are responsible for (1) their refractoriness towards subsequent silver recovery; (2) their not passing the TCLP stability test before and/or after their treatment via lime boil and/or cyanide leaching; and (3) incomplete base metal dissolution. Also, it is believed that arsenic bearing solid $Fe-SO_4$ species, such as basic ferric arsenate, are less stable in a lime boil treatment step, i.e., more soluble than the ferric arsenates, such as scorodite, which do not contain sulphate.

Thus, the process of this disclosure operates the pressure leach process at solids contents lower than that required to operate autothermally with ambient quench water, in order to produce a solution composition with low acidity and sulphate concentration. This is made possible by altering the process flow diagrams, as shown in the embodiments of FIGS. 3-7, and by altering the heat balance for the pressure circuit, for example to incorporate process water heating and/or heat recovery unit operations to enable higher temperature process solution to be made available to the autoclave.

A major benefit to operating with higher temperature process solution, compared to autothermal operation with ambient quench water, and reducing the pulp density in the pressure leach step, is that the acid and sulphate concentrations in the autoclave are lowered, which in turn reduces the formation of sulphate bearing iron and arsenic phases, such as jarosites, basic iron arsenic sulphate (BFAS) and other phases which incorporate silver and/or copper. Depending on the particular feed, and the particular configuration for the process, additional benefits can include:

i. For sulphidic feeds containing commercially appreciable amounts of silver, improved silver recovery by direct cyanidation of the pressure leach residue, without the need for a jarosite destruction step (such as lime boil) applied to the solids;

ii. Lower residual sulphate levels in the pressure leach residue, leading to a lower lime/limestone requirement in its cyanidation;

iii. Higher solution volume:solids ratio in the autoclave, allowing for greater oxygen addition rates per mass of feed solids;

iv. Environmentally stable solids, as measured by TCLP testing, after pressure leaching and after cyanidation;

v. Improved stability of pressure leach solids, when in contact with hot, acidic pressure leach solution, resulting in less redissolution of arsenic and iron prior to solid liquid separation of the pressure leach solids and solution;

vi. With higher oxygen addition rates per mass of feed solids possible, operating at lower pulp densities allows shorter retention times to be used that more closely follow the rapid sulphide leach kinetics. Shorter retention times offset to some degree the increase in pressure vessel volume that would be expected when operating at lower pulp densities;

vii. Lower iron and/or arsenic concentrations in the pressure leach solutions;

viii. Lower copper and acid concentrations in the pressure leach solution resulting from operating with reduced pulp densities allows for high copper recoveries by solvent extraction, without the need for dilution or with significantly reduced requirements for dilution;

ix. When the autoclave is operated with feed(s) providing a high arsenic content to the autoclave (i.e., total feed as aqueous feed slurry to the autoclave) so as to provide a Fe:As molar ratio between about 2:1 and 10:1, and copper is recovered, the process can provide additional advantages compared to current autothermal industrial processes, including:

a. Higher net copper extractions, due to less precipitation of Cu—As or Cu—Fe—As phases during pressure leaching;

b. Improved stability of pressure leach discharge solids while in contact with the leach solution at atmospheric pressures and temperature, reducing the requirement to limit the temperature and time prior to solid liquid separation; and c. Simplified cyanidation flowsheet with lower cyanide and lime consumption due to lower residual copper and sulphate, respectively, reporting to the cyanidation feed.

In the above-noted Sherritt patent application, the lower limit for the Fe:As molar ratio for materials advantageously treatable was set at 4:1, with lower values being associated with copper extractions below around 94%, a lower stability of the solids to time at temperature/acidity prior to solid-liquid separation, and a lower environmental stability of the pressure leach residue solids (4 to 5 mg/L As in TCLP). In the process described herein, because of the decrease in copper losses and the improved solids stability at atmospheric pressure and temperature, in some embodiments, the pressure leach can operate economically at much higher arsenic content in the autoclave feed (or a much lower Fe:As mol ratio), when operating at lower pulp densities, as compared to operating at higher pulp densities in the pressure leach feed. This allows more arsenic to be fixed as a stable residue per autoclave volume and expands the range of feed materials and/or blends of feed materials that can be treated advantageously by pressure leaching.

The process of this disclosure overcomes problems associated with the above-described Newmont gold/silver process, as no additional reagents are required and, without the addition of calcium-based neutralizing agents to the autoclave, scaling is reduced. In addition, the acid generated in the pressure leach is available for use in downstream processing (e.g. copper oxide heap leach), since the present process has no need for adding neutralizing agents to the autoclave. Still further, the process of this disclosure establishes that both copper and silver can be recovered in high yields from high arsenic feeds, whereas such feeds were not addressed in the Newmont process.

Sulphidic concentrates that are particularly amenable to being treated by the process of this disclosure are those that:

i. Contain base metals, and especially copper, nickel and/or cobalt; and/or ii. Contain precious metals, particularly silver, which are to be recovered after pressure leach pre-treatment; and/or iii. Contain contaminants such as arsenic, which may cause the final process residue to be characterised as hazardous waste, as defined by the TCLP material stability test procedure.

In some embodiments of the process, a majority of the silver in a sulphidic feed material can be recovered from a residue produced by pressure leaching, including oxidation of the sulphide sulphur to sulphate to produce an acidic leach liquor, using direct cyanidation, with no other intermediate treatment(s) being needed to destroy jarosites. This is a stark contrast from the majority of acidic pressure leaching or pressure oxidation processes for sulphide concentrates containing silver, as the formation of argentojarosite under those conditions results in residues where silver is not readily recoverable by direct cyanidation. Thus, the ability to produce solids in the pressure oxidative leaching step, from which silver in the feed can be recovered without a lime boil treatment is a major and heretofore unknown outcome for the process. As well, eliminating the need for lime boil treatment for silver recovery, means that the stable phases formed during high temperature pressure leaching can be preserved through cyanidation, resulting in a more stable solid residue after pressure leaching and cyanidation (as measured by arsenic in TCLP leachate).

In addition to pressure leach residue prepared according to this process being amenable to direct cyanidation, the cyanide solution produced is amenable to any of the commercial processes for recovering silver, including carbon adsorption, carbon elution, zinc precipitation, electrowinning and cyanide recovery.

The process reduces the adverse impact of feed arsenic levels on copper extraction, and thereby allows high copper pressure leach extractions to be achieved from arsenical concentrates, concentrate blends and other feed materials that would not otherwise be possible to advantageously treat with other pressure leach processes. The process also reduces the adverse impact of feed arsenic content on the short term stability of the solids (i.e., limiting the redissolution of the solids during temperature and/or pressure letdown prior to solid-liquid separation) and on the long term environmental stability of the solids (i.e., as measured by arsenic in TCLP leachate).

The process allows the mass transfer issues associated with adding oxygen to an autoclave with a highly reactive feed material to be addressed. Oxygen addition in an autoclave is physically limited by the ability to incorporate a sufficient quantity of oxygen into a fixed volume within a given time span. By reducing the pulp density in the autoclave compartments, more oxygen can be transferred to the solution per mass of concentrate, due to the larger solution volumes. Thus, there is the potential to supply enough oxygen to allow shorter autoclave retention times to be used instead of being constrained to operating at longer retention times because of physical, rather than chemical oxygen transfer limitations.

In some embodiments, the process generates more favorable solid precipitates than in a pressure leach operated autothermally with ambient temperature quench water, which provides the following beneficial features (compared to autothermal operation):

i. Less precipitation of copper from solution as Cu—As or Cu—Fe—As precipitates, and, therefore, higher copper recoveries;

ii. Less precipitation of solids, such as argentojarosite, from which silver is not leachable with cyanide unless treated with an intermediate lime boil step, resulting in high silver recoveries without the costs of a lime boil circuit, without the reduced environmental stability of the resulting residues, and without the issues associated with high levels of copper present in solution during cyanidation; and iii. Pressure leach residues which not only pass the EPA TCLP test, in particular in terms of arsenic, but which also pass this test after having been subjected to cyanidation.

As set out in the embodiments of FIGS. 3-7, an integrated process is provided to recover base metals such as copper and/or precious metals, including the pressure leaching autoclave, heat recovery system and/or a process solution heating system, pressure/temperature letdown, slurry/solids handling prior to solid liquid separation, and cyanidation. The process also addresses the environmental disposal/stability of the cyanidation residue. Because the acid of the pressure leach step is not destroyed in the process, integration of the copper- and acid-containing product solution with copper heap leach is possible. Copper recovery is by solvent extraction and electrowinning processes and/or other known copper recovery methods. While some embodiments of the process generate a larger volume of more dilute solution than is generated at higher pulp densities, the more dilute solution can be easier to integrate with solvent extraction and electrowinning than more concentrated solutions that would otherwise be produced, thereby avoiding or reducing the need for pre-dilution, for example as described in U.S. Pat. Nos. 5,698,170 and 6,680,034.

EXAMPLES

Example 1

Testwork was performed on a sample of a Cu/As sulphide concentrate from a mine located in South America. The concentrate assayed (by weight): 5.6% As, 32.0% Cu, 14.8% Fe and 29.5% sulphide sulphur, as well as 444 g/t Ag. Single stage pressure leaching tests were conducted in an autoclave at pulp solids contents of 2, 4, 6, 8, 10 and 12 wt % under conditions of 220° C., 500 kPa oxygen pressure, residence time 60 minutes and using synthetic process water containing 0.25 g/L Cl, added as NaCl. After the pressure leach, the liquid and solid phases were separated and the leach residues were washed and directly subjected to a 24 hour cyanide amenability (CNA) test, without prior treatment with a lime boil.

Figure 8:
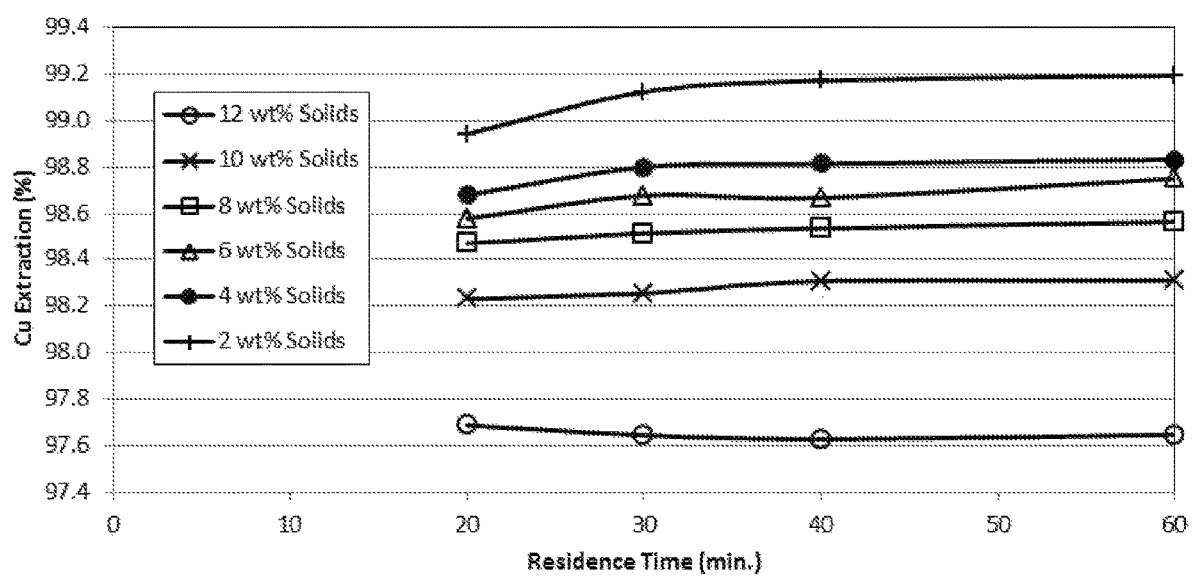
FIGS. 8-24 are graphs showing experimental results produced developing the process of the disclosure with a number of sulphidic feeds.

The results, as shown in FIG. 8, showed that copper extraction consistently increased as the pulp solids content was dropped from the highest pulp solids content used (i.e., 12 wt %), with an additional 1% copper extraction at solids contents of 6 wt % or less, and up to 1.5% at 2 wt % solids. At the highest solids content tested, the copper extraction reached its maximum within 20 minutes, and decreased slightly at longer leaching times. At lower solids content, although the majority of copper extraction was completed within 20 minutes, leaching slowly continued at longer leaching times, with a further 0.1 to 0.3% copper extraction being achieved after 60 minutes.

During the pressure leaching of this concentrate at pilot scale (12 wt % solids), the physical limitation of the pilot plant installation was reached in the rate of addition of oxygen that could be added per unit slurry volume, due to the rapid sulphide oxidation rates encountered. As a result, longer retention times (i.e., 60 min) were beneficial. However, it was apparent that, with a lower solids content, for example operating at 2-10 wt % solids, or at 6 wt % solids, the same oxygen addition rate per unit volume could be used, but the retention time could be reduced, for example to about 30 min, to process the same mass of solids through the autoclave while significantly increasing the copper extraction.

This significant and surprising improvement in copper extraction with a decrease in the solids content in the pressure leach is believed to be due to the reduced formation of Cu—As compounds, in particular copper arsenate and/or basic copper arsenate.

Figure 9:
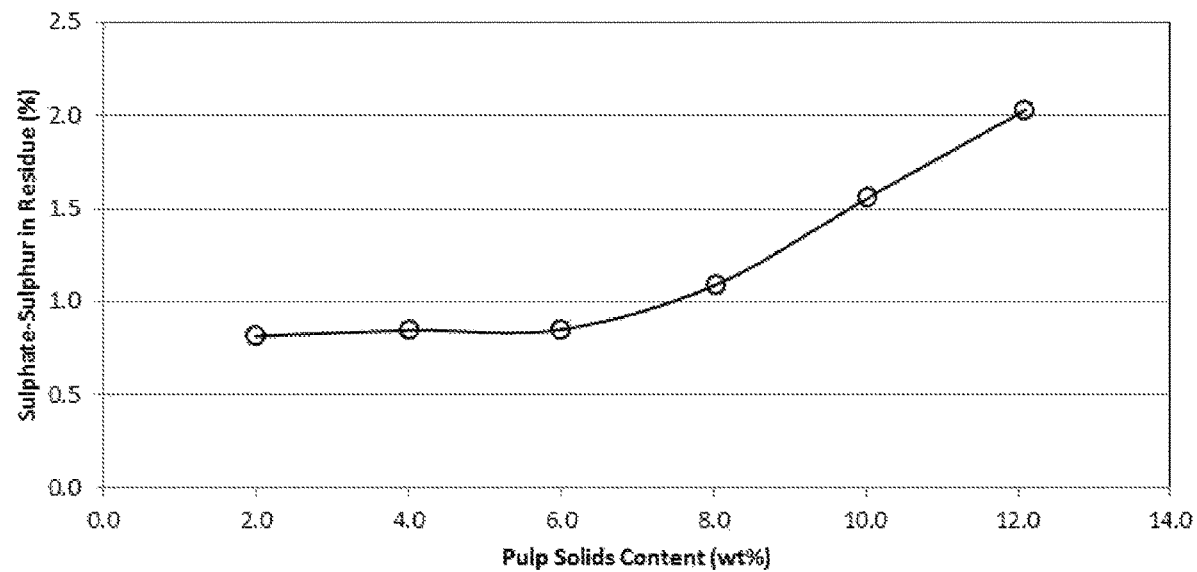

Sulphate sulphur levels in the pressure leach residues are shown in FIG. 9. As the solids content was decreased from 12 wt % down to 6 wt %, the sulphate sulphur in the pressure leach residue also decreased, but further reductions in solids content did not further reduce the sulphate sulphur content in the pressure leach residue.

Figure 10:
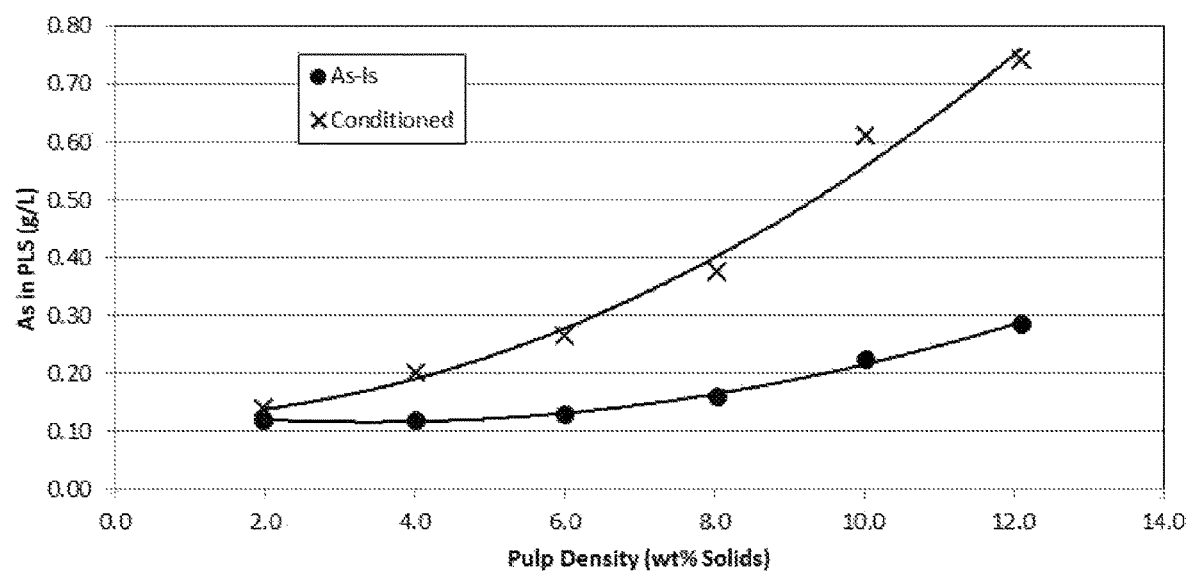

To assess the stability of the solids from the pressure oxidative leaching, the residue pulp from the leaching step was held for 30 min at 95° C. (herein termed "conditioning") to approximate the conditions in commercial operations between the discharge of the autoclave and solid liquid separation. The arsenic in solution before and after the conditioning step is shown in FIG. 10. The results for arsenic concentration in solution showed that the conditioning step following the pressure leaching caused As re-dissolution, but the re-dissolution was significantly decreased as the solids content was lowered in the pressure leaching step. At 2 wt % solids, the arsenic re-dissolution during the conditioning step was minor.

The analyses of the leachates from TCLP testing of the residues after pressure leaching and after cyanidation are shown in Table 1 below. While the residues after pressure leaching and cyanidation all passed the TCLP test for arsenic, the arsenic value at the highest solids content approached the legal limit of 5 mg/L. The lowest TCLP leachate values were achieved at between 4 and 8 wt % solids in pressure leaching.

TABLE 1

| TCLP Determinations on Final Residue (ppm) | | | | |
|---|---|---|---|---|
| % Solids | Ag | As | Ba | Pb |
| 12 | 0.12 | 4.52 | <0.01 | <0.01 |
| 10 | 0.33 | 3.01 | <0.01 | <0.01 |
| 8 | 0.71 | 1.20 | 0.01 | 0.02 |
| 6 | 0.80 | 1.20 | 0.02 | 0.02 |
| 4 | 0.03 | 1.30 | 0.03 | 0.03 |
| 2 | 0.17 | 2.19 | 0.06 | 0.03 |
| Legal Limits | <5.0 | <5.0 | <100 | <5.0 |

Figure 11:
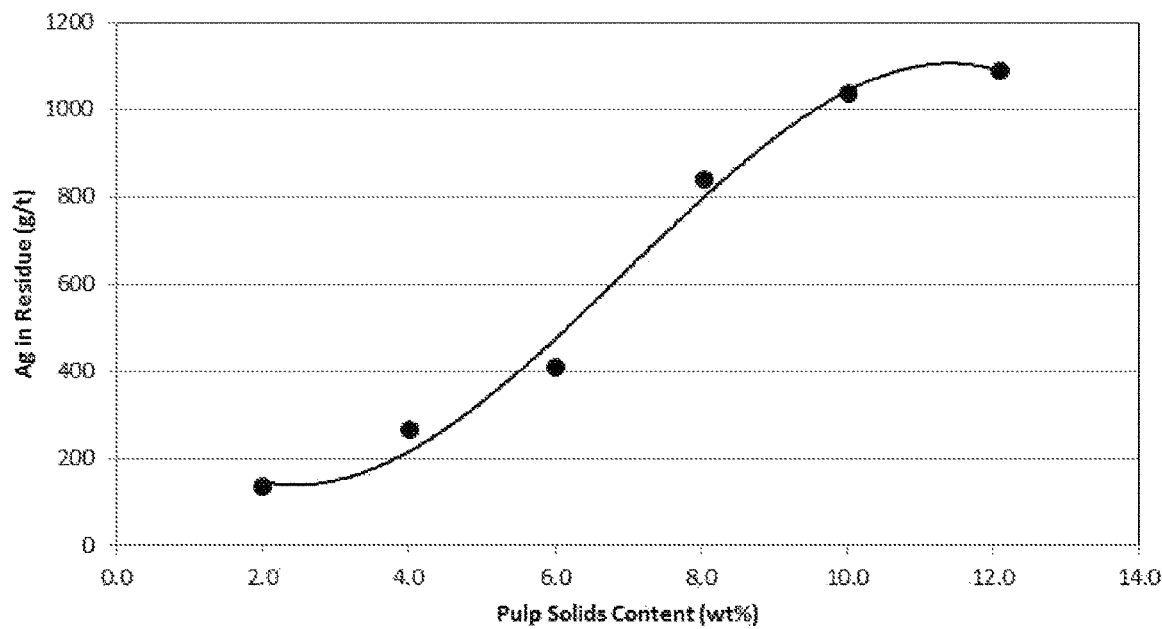
Figure 12:
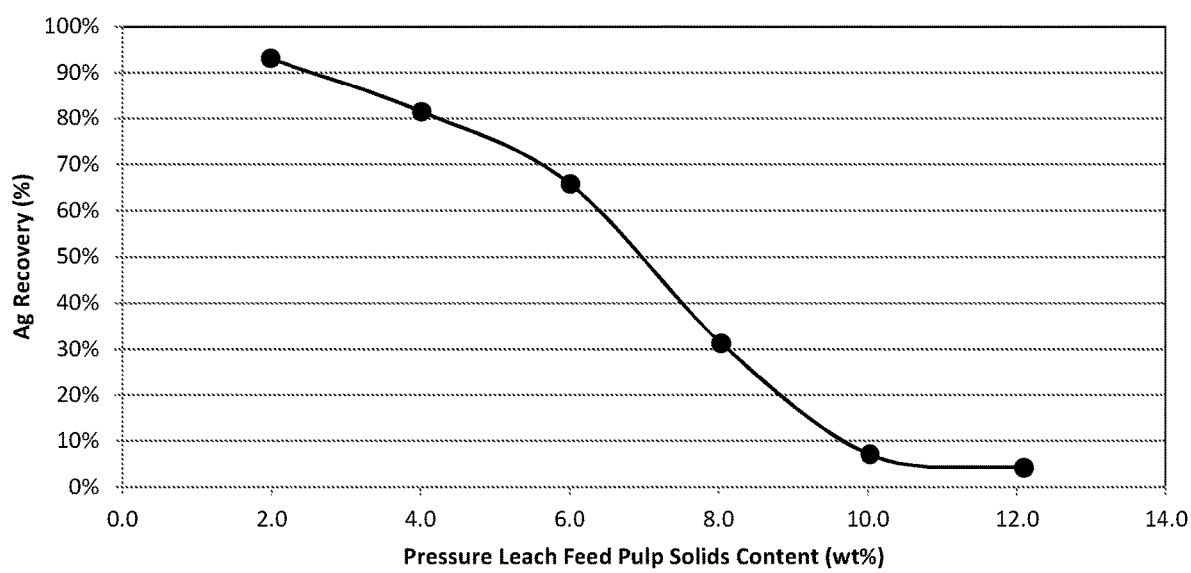

The results of direct cyanidation of the pressure leach residues are shown in FIGS. 11 and 12. At a solids content of 12 wt %, the silver recovery was less than 5%, whereas at 2 wt % solids, the silver recovery was 93%. While heretofore unknown, at low solids content, for example at 2 to 6 wt %, silver recovery by direct cyanidation is improved sufficiently such that a lime boil step is not longer needed to recover the majority of the silver.

Example 2

To further illustrate the heretofore unknown effect of low solids on the silver recovery, the copper concentrate of Example 1 was processed under conditions to approximate an autothermal operation of the pressure leaching step, i.e., at conditions where the solids content and the sulphide content of the feed, by chemical reaction, is sufficient to provide 100% of the heat required for the pressure oxidative leaching step, and then at conditions of lower solids, in which the sulphide content of the feed is less than that needed for autothermal operation of the pressure oxidative leaching step. The aqueous synthetic process solution was as in Example 1.

A. 12% Solids Pressure Leach

For the process conditions to approximate autothermal pressure oxidative leaching, a volume of 2.5 L slurry was prepared with the concentrate and the synthetic process solution, at a pulp density of 12 wt % solids. The slurry was placed in a 3.8 L titanium autoclave, and the autoclave was sealed and heated to 220° C., at which time the autoclave was pressurised with oxygen gas at an overpressure of 500 kPa, with continuous venting to avoid the buildup of inert gases. After sixty minutes, the oxygen flow was stopped, and the autoclave was cooled with tap water and depressurised. After another 30 minutes of agitation, the autoclave was opened and the contents were filtered and washed with water. The pregnant leach solution contained 43.4 g/L free sulphuric acid. The copper extraction was 97.7%. The washed pressure leach residue was then slurried with water at a pulp density of 10 wt % solids, and the resulting slurry was adjusted with lime and sodium cyanide to a pH of 10.5-11.0 and a cyanide concentration of 2 g/L. The cyanidation slurry was agitated in a rolling bottle for 24 hours, after which the cyanidation slurry was filtered and washed. The silver extraction was 4.1%. The cyanidation residue was tested according to the TCLP method, showing 4.5 mg/L As.

B. 4 wt % Solids Pressure Leach

The concentrate and synthetic process solution as in Example 1 were used to make up 2.5 L of slurry at a pulp density of 4 wt % solids. Following above pressure leach procedure, the pregnant leach solution (PLS) contained 20.7 g/L free sulphuric acid. The copper extraction was 99.0%. The pressure leach residue was subjected to cyanidation in a rolling bottle, following the above procedure. The silver extraction was 81.4%, as calculated on the basis of the silver head grade. The cyanidation residue was tested according to the TCLP method, showing 1.3 mg/L As.

C. Varying Solids Pressure Leach

The concentrate was similarly processed at solids contents of 10, 8, 6 and 2 wt % solids in the pressure oxidative leaching step. The silver extractions, calculated on the basis of the silver head grade are shown in Table 2.

TABLE 2

Silver Extraction

| % wt Solids | Ag Extractions (%) |
|---|---|
| 12 | 4.1 |
| 10 | 7.0 |
| 8 | 31.2 |
| 6 | 65.7 |
| 4 | 81.4 |
| 2 | 93.0 |

Figure 13:
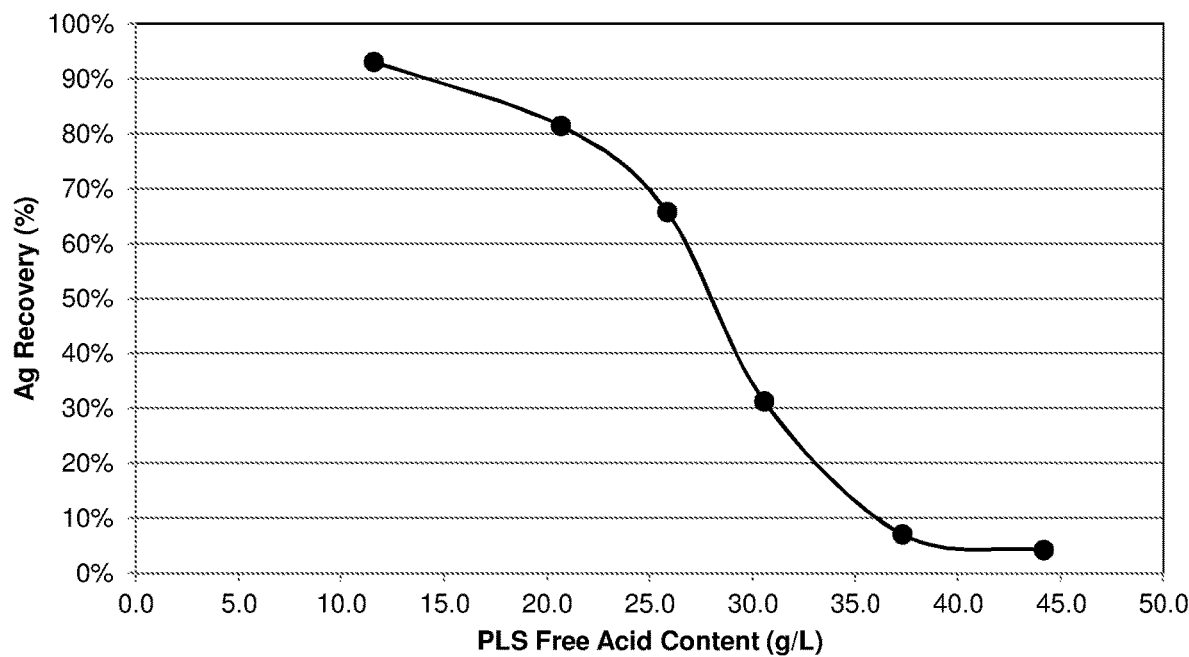

FIG. 13 is a graph showing silver recovery as a function of the free acid content in the PLS (i.e., in the liquid phase from the pressure oxidative leaching step), as the solids were increased from 2 wt % (left side of graph) to 12 wt %. The point of inflection in the graph for silver recovery above 50% occurred at 30 g/L free acid, and corresponded to a solids content below about 8 wt % solids.

Example 3

Further batch pressure leach tests at various starting pulp solids contents were done in a 3.8 L autoclave, at a temperature of 220° C. and an oxygen overpressure of 500 kPa. Leaches were done in synthetic process water, containing either 250 or 1400 mg/L chloride. Neither chloride content was found to significantly alter the results presented below. The residence time was in each case 60 minutes, with regular samples being withdrawn for determination of leach kinetics. On completion of each pressure leach, the autoclave was cooled to around 90° C., at which temperature the leach pulp was allowed to react for 30 minutes ("conditioning") to approximate the conditions in commercial operations between the discharge of the autoclave and solid liquid separation. After filtration and washing, pressure leach residues (with and without conditioning) were subjected to direct cyanidation in a rolling bottle for 24 hours for silver dissolution. Final residues were analysed for silver by fire assay.

Test Procedure

The equipment used was a 3.8 L autoclave. Each test pulp was made up with feed solids and synthetic process water to take up a volume of around 2500 mL at room temperature. Synthetic process water was made up with tap water treated by reverse osmosis ("RO water"), with additions of potassium chloride, sodium chloride and calcium chloride dihydrate, at mass ratio's of 1.2:17.7:1.5, corresponding with the desired chloride concentration of the synthetic process water. The autoclave was charged accordingly with the feed pulp, and sealed. The autoclave was heated to target temperature before adding oxygen to the target pressure to the autoclave. Continuous venting of the autoclave through a condenser, while maintaining a target pressure of 2720 kPa(g) in the autoclave, served to avoid the buildup of inert gases. Rate samples were collected during the leach at set times. After completion of a pressure leach, the oxygen flow was shut off, and the autoclave was cooled to a temperature of 90 to 95° C. for 30 minutes, while maintaining agitation. Following this conditioning period, the autoclave was cooled to room temperature. The autoclave was then opened and discharged.

The leach slurry was filtered and undiluted filtrate was collected for chemical analysis. The residual filter cake was washed to remove entrained solution, and a small quantity of the washed filter cake was dried for subsequent chemical analysis. Washed filter cake was then charged into a glass bottle with RO water at a ratio of about 1 g:10 mL, and lime was added to adjust the pulp pH to around 10.5-11. An addition of 2.0 g/L sodium cyanide was then made, and the glass bottle was rotated in a horizontal position overnight on a set of mechanical rollers. After 24 hours, the pulp was filtered, and the final residue washed with RO water. The final residue was tested for environmental stability according to the TCLP procedure specified by the US EPA.

Three copper concentrates from South America were tested, with assays as in Table 3.

TABLE 3

Assays of Concentrates

| Component | Concentrate A | Concentrate B | Concentrate C |
|---|---|---|---|
| Al, wt % | 0.40 | 1.12 | 1.20 |
| As, wt % | 7.8 | 2.72 | 5.61 |

TABLE 3-continued

Assays of Concentrates

| Component | Concentrate A | Concentrate B | Concentrate C |
|---|---|---|---|
| Cu, wt % | 21.9 | 30.8 | 32.0 |
| Fe, wt % | 25.0 | 20.3 | 14.8 |
| Si, wt % | 1.58 | 2.98 | 3.52 |
| Total Sulphur, wt % | 42.3 | 33.0 | 30.2 |
| Sulphide Sulphur, wt % | 42.0 | 32.6 | 29.5 |
| Silver, g/t | 87 | 469 | 697 |
| Fe:As mol ratio | 4.3 | 10.0 | 3.5 |

Figure 14:
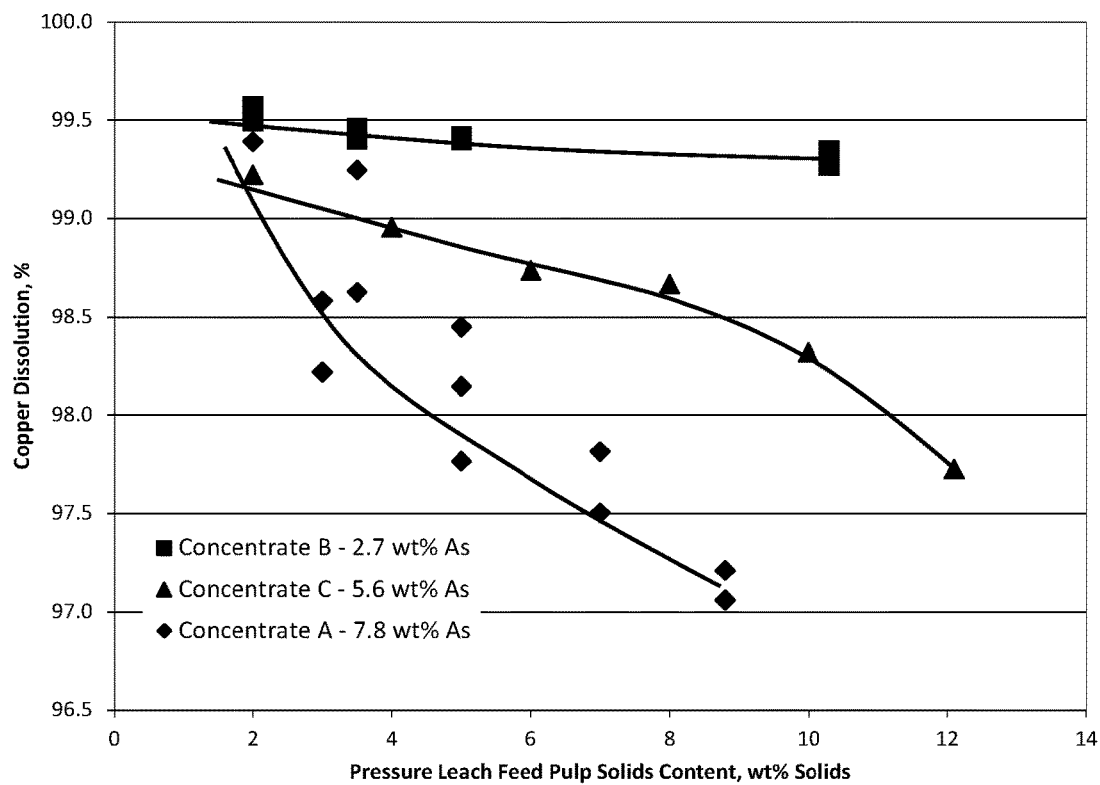

The benefit in copper dissolution achieved by operating at a low feed pulp density was shown to vary with the arsenic content of the feed material, the benefit being greater, the greater the arsenic content, as shown in FIG. 14. Surprisingly, the extent of the negative effect of arsenic was much reduced at lower pulp solids content. While not being bound by the same, it is believed that the Cu—As compound, the formation of which is responsible for reduced copper extractions with a higher arsenic presence, is generated in lesser amounts at the lower feed pulp solids content. As shown in the FIG. 14, at solids contents below 10 wt %, for the sulphidic feeds of this example, copper dissolution in the pressure leaching was above 97.0%, even for arsenic content as high as 7.8 wt %. Significantly higher copper dissolution was achieved at lower feed pulp solids contents of 2-7 wt %, with copper dissolution above 98.5% and above 99.0% for concentrates having arsenic content as high as 5.6 wt %.

Figure 15:
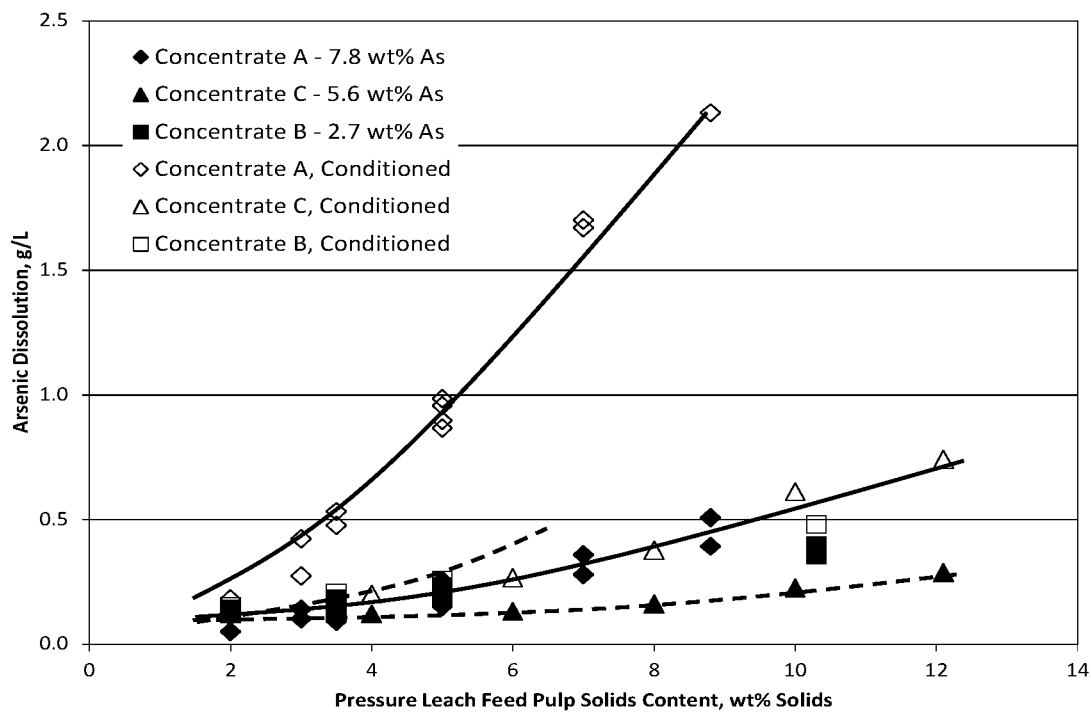

In the pressure leach process at low feed solids content, arsenic largely remained in the solid residue during the pressure leach, with limited redissolution of arsenic taking place during the conditioning step. When pressure leaching at higher solids contents, for example above 10 wt %, arsenic redissolution was much more pronounced. The tests demonstrate that the benefits of operating at a reduced feed solids content are more pronounced with higher feed arsenic concentrations, as shown in FIG. 15. Operating a pressure leach of an arsenic bearing copper concentrate at a feed pulp solids content of below 7% limited arsenic in the pregnant leach solution (PLS) to 0.5 g/L or less, while arsenic redissolution was suppressed further by operating at even lower feed pulp solids content. By operating the pressure leaching step at lower feed pulp solids contents, the unwanted arsenic dissolution in the pressure leach slurry prior to solid liquid separation is greatly reduced compared to autothermal operation at higher solids content.

Figure 16:
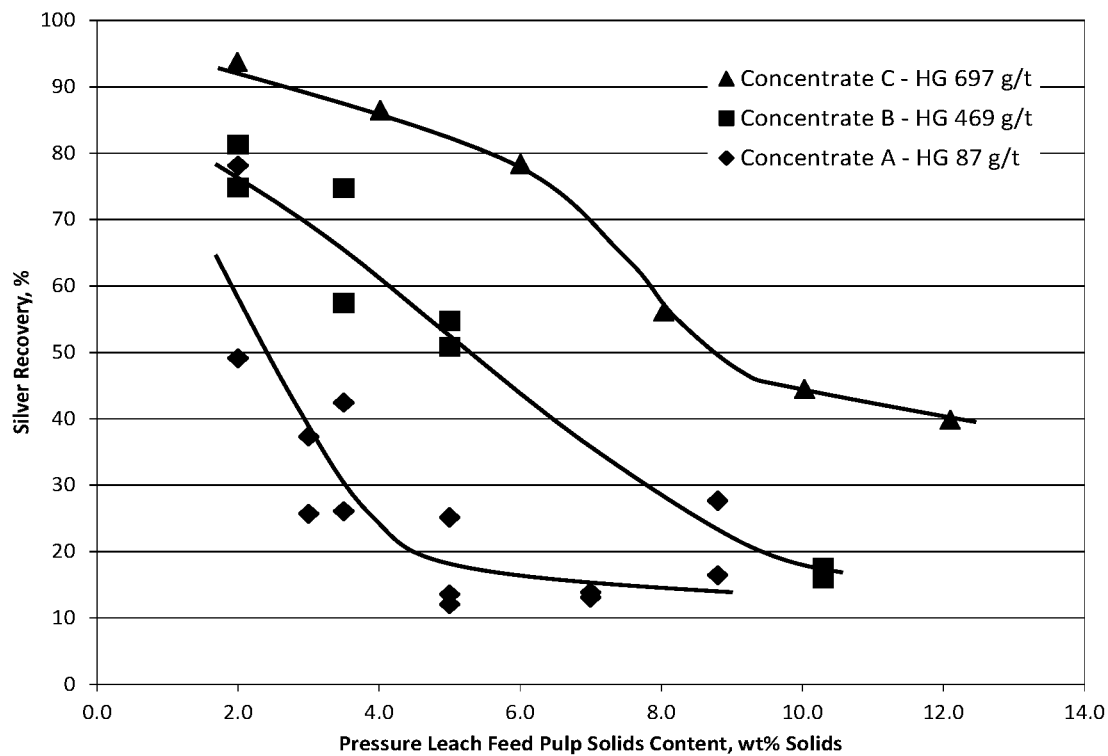

FIG. 16 illustrates silver dissolution after direct cyanidation of the pressure leach residues as a function of the pressure leach pulp solids content, and shows the heretofore unknown benefits of operating at low feed pulp solids contents. As set out in the Background, conventional thinking is that silver will form solid phases under pressure leaching conditions, such as argentojarosite, that only sparingly, if at all, can be leached in a subsequent cyanidation. Thus, to convert the solid silver compounds to compounds that are leachable in cyanide solution, the prior art teaches destroying them, for example with a lime boil. FIG. 16 shows that the solid silver compounds generated in the pressure leach step are gradually less refractory towards cyanidation, as the pressure leach feed pulp solids content is reduced, without a clearly defined limit above which cyanidation is ineffective, and below which cyanidation is effective. Rather, the transition from cyanide-refractory to cyanide amenable solid silver phases is very gradual at the low feed pulp solids contents tested.

Figure 17:
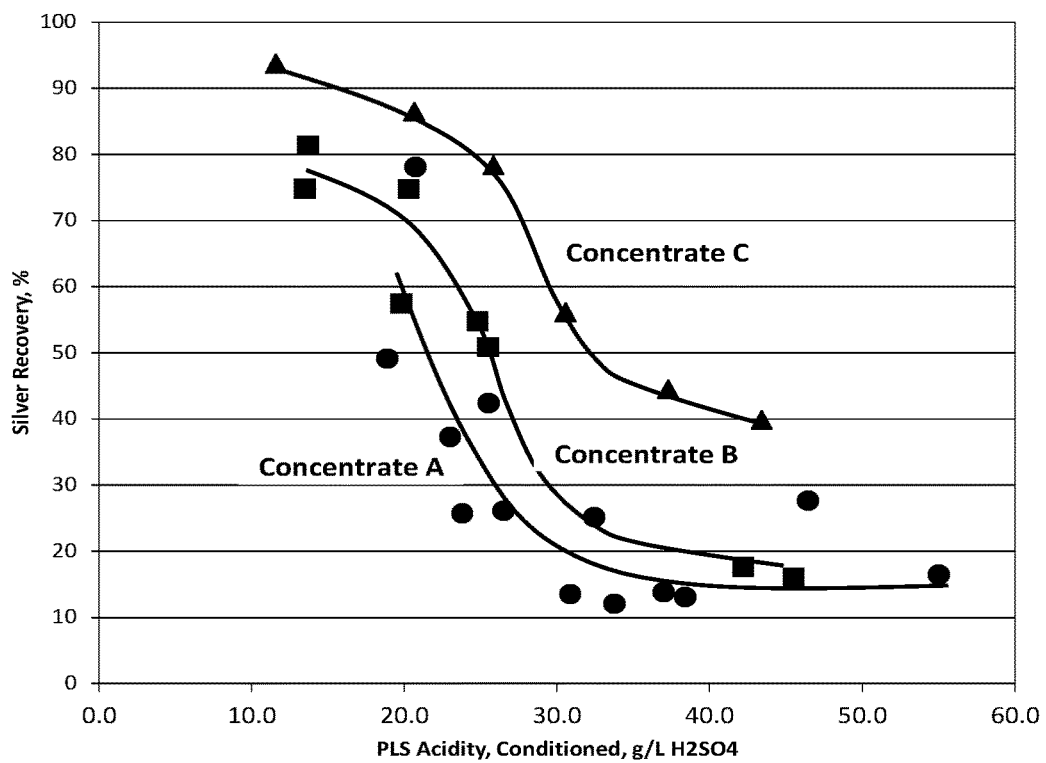

Lowering the feed pulp solids content resulted in, and corresponded to, a reduction in the acidity (free acid level) of the solution, with the most significant increase in silver recovery for all three concentrates occurring when the acidity of the solution was lowered to below 30 g/L, and more particularly to below 27.0 g/L $H_2SO_4$. The greatest increase in silver recovery occurred between 20 and 30 g/L $H_2SO_4$, between 20 and 27 g/L and between 20 and 25 g/L, with silver extractions plateauing for at least two of the concentrates at concentrations below 20 g/L, as shown in FIG. 17. In this example, a majority of the silver in the initial feed (i.e., more than 50%) was recovered with the low solids, low acidity process for arsenic levels tested being as high as about 7.5 wt %. As noted above, this is contrary to conventional thinking, with silver being recovered after pressure leaching at low solids content, without a jarosite destruction step. Thus, solid silver compounds generated in the pressure leach operating at or below 30 g/L free acid, are consistently less refractory towards cyanidation than those generated at higher free acid levels, with a consistent transition interval, above which direct cyanidation is less effective, and below which direct cyanidation is surprisingly effective. In this example, the transition from generating cyanide-refractory to cyanide-amenable solid silver phases was seen over the interval between 30 and 20 g/L free acid.

Figure 18:
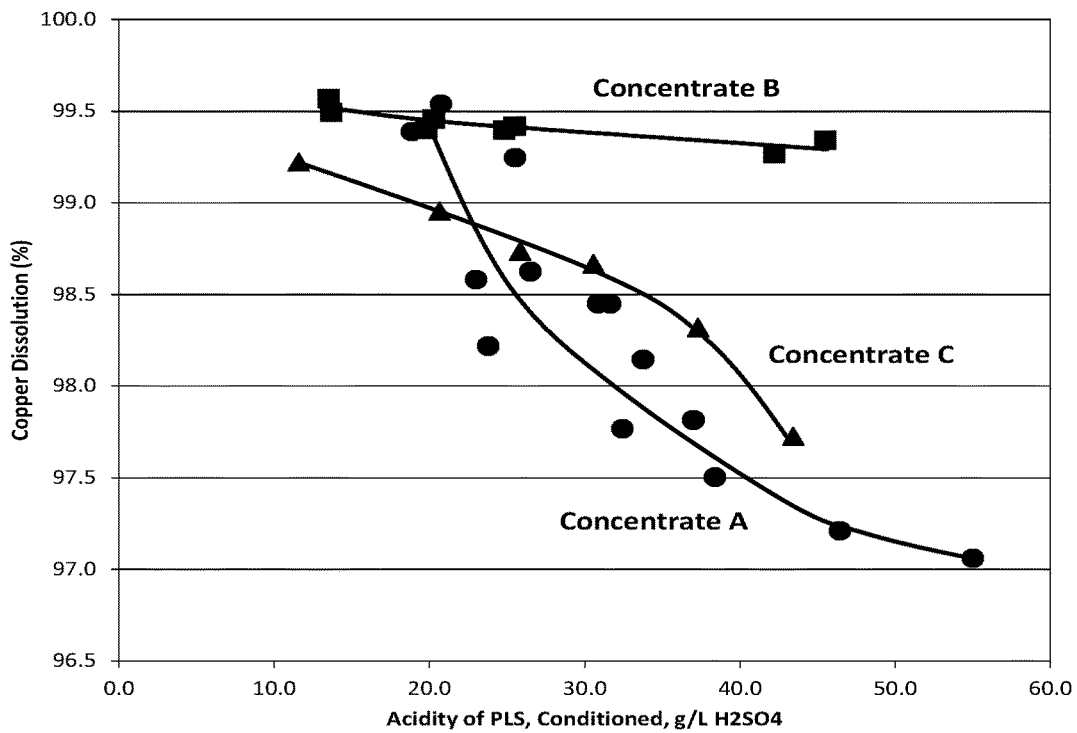

Plotting copper extractions against the free acid concentration in PLS is shown in FIG. 18. Copper dissolution above 98.0% can be achieved at free acid levels below 30 g/L, and above 99% for free acid levels between 20 and 27 g/L or between 20 and 25 g/L, depending on the arsenic level in the feed. As shown, at higher feed pulp solids content and higher free acid levels, copper extraction was affected more negatively, the more arsenic was present. Surprisingly, however, the extent of the negative effect of arsenic was reduced at the lower PLS free acid concentrations. The refractory Cu—As compounds which are believed to be responsible for reduced copper extractions with a higher feed arsenic content, is generated in lesser amounts at the lower PLS free acid concentrations.

Figure 19:
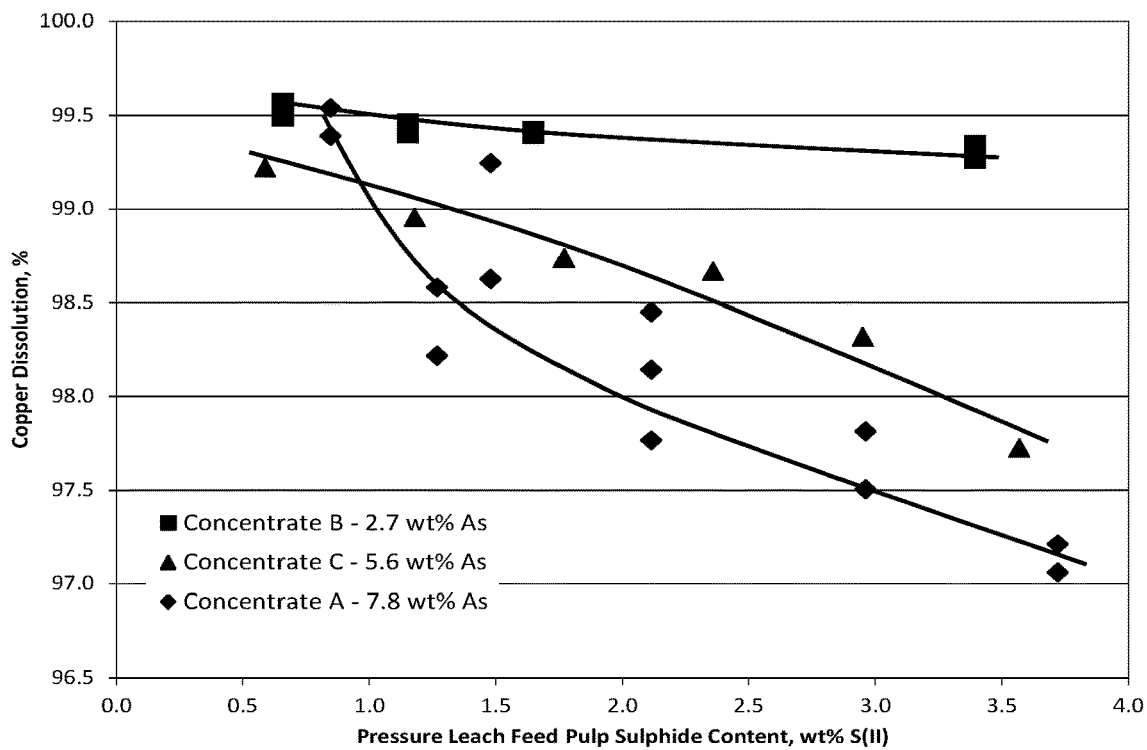
Figure 20:
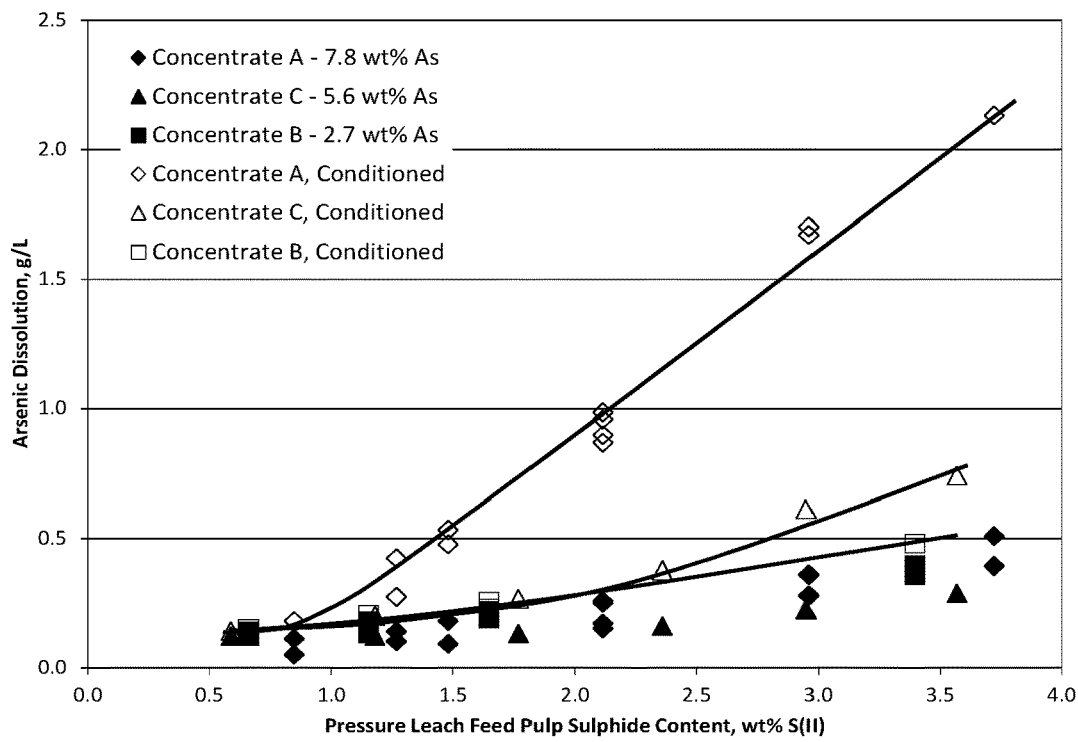
Figure 21:
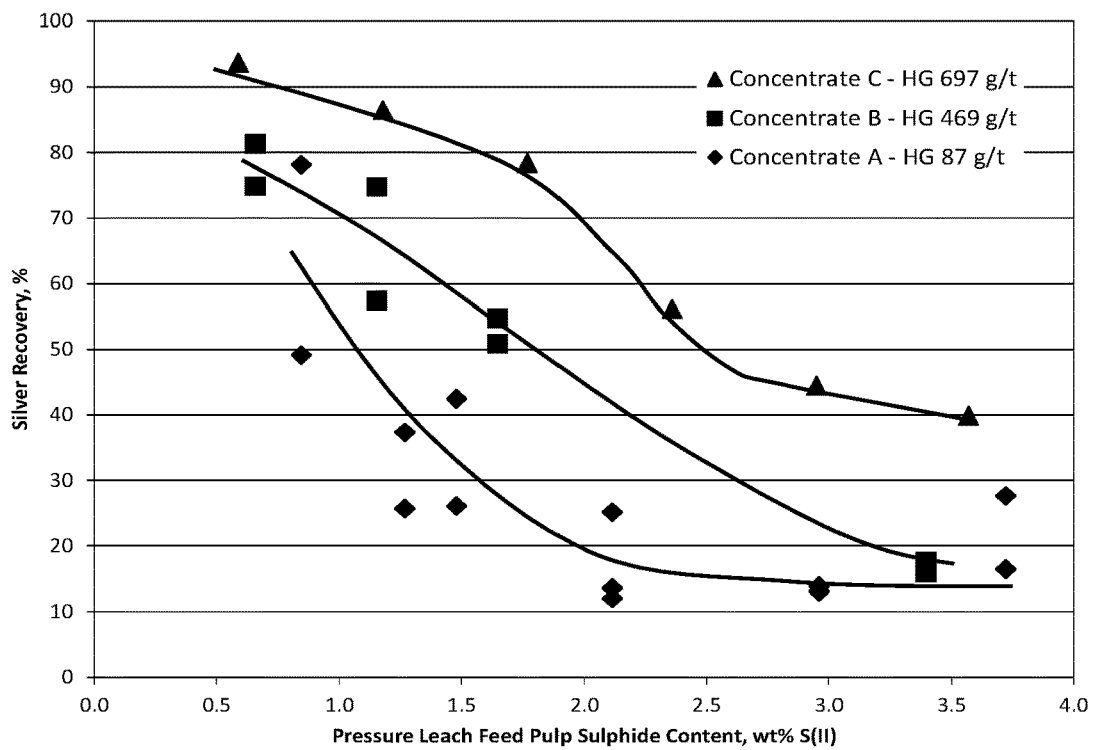

While the above results show the surprising results of operating the pressure leach step at low pulp solids content, the target operating conditions for the solids feed for the process, that is sufficiently low solids content to maintain the free acid in the liquid phase below about 30 g/L, varies with the sulphide sulphur content of the initial sulphidic feed. FIGS. 19, 20 and 21 show dissolution of copper, arsenic and silver as a function of the pressure leach pulp sulphide content (i.e., wt % sulphide), rather than as the solids content of the previous graphs. The results demonstrate that, the above-noted advantages for improving copper and silver recovery, and for limiting arsenic dissolution, correspond to a solids content in pressure oxidative leaching step being sufficiently low such that the sulphide level in the aqueous feed slurry is below 3 wt %, or below 2.5 wt %, or below 2 wt %. This is demonstrated for the three particular concentrates, each having a sulphide content above 25 wt %.

Figure 22:
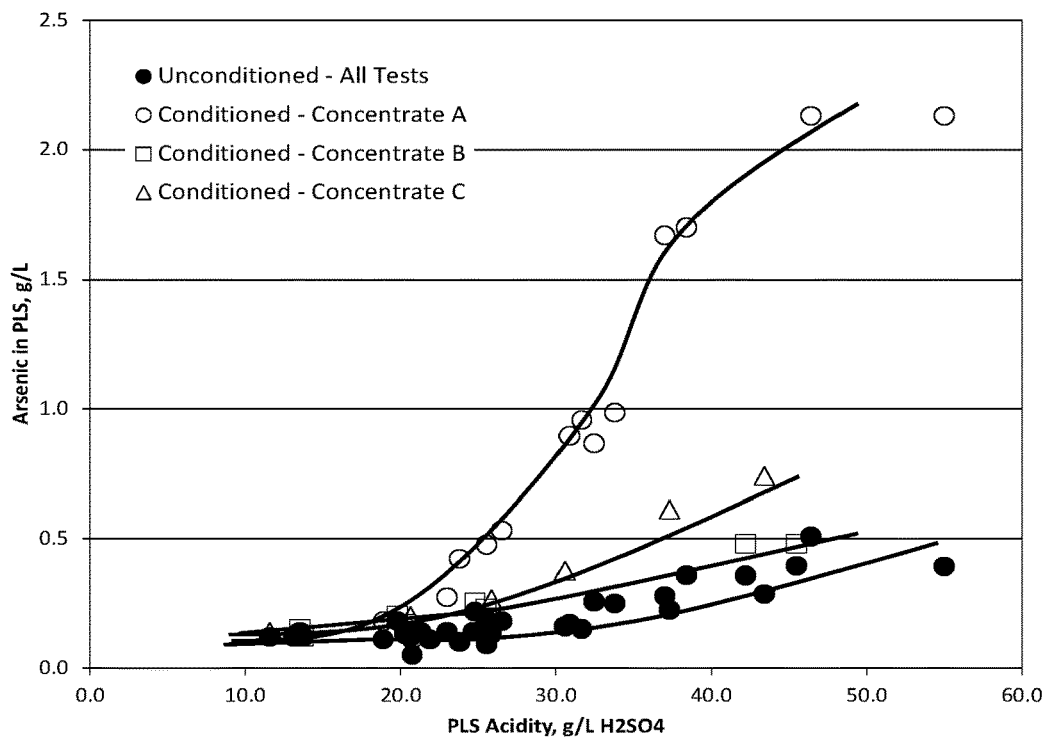

FIG. 22 plots arsenic dissolution in the PLS against PLS acidity, showing considerable arsenic dissolution at acidity above 30 g/L, while at acidity at or below 27, such as acidity between 20 and 25 g/L, or below 20 g/L, the arsenic dissolution is below 0.5 g/L, even after a conditioning step.

Example 4

Testwork was done on various blends of concentrates and a high arsenic metallurgical flue dust to explore the relationship between the arsenic content and the Fe:As mole ratio in the autoclave aqueous feed slurry (i.e., the ratio of the total moles of iron and arsenic added in all the solutions and solids added to the autoclave) and the copper extraction. The testing was performed as set out in Example 3, but with blends made up to target a range of arsenic concentrations (2.7 to 8.0 wt % As) and iron concentrations (12.4 to 25.0 wt % Fe). For the blends tested at a feed pulp solids content of 3.5 wt %, the feed pulp solids content represented equal to, or less than 40% of the heat input corresponding with autothermal operation. This was contrasted with tests at higher feed solids so as to represent autothermal operation (i.e., sufficient for about 100% of the heat required for the process being supplied by the reaction of the sulphide content of the feed concentrate).

Figure 23:
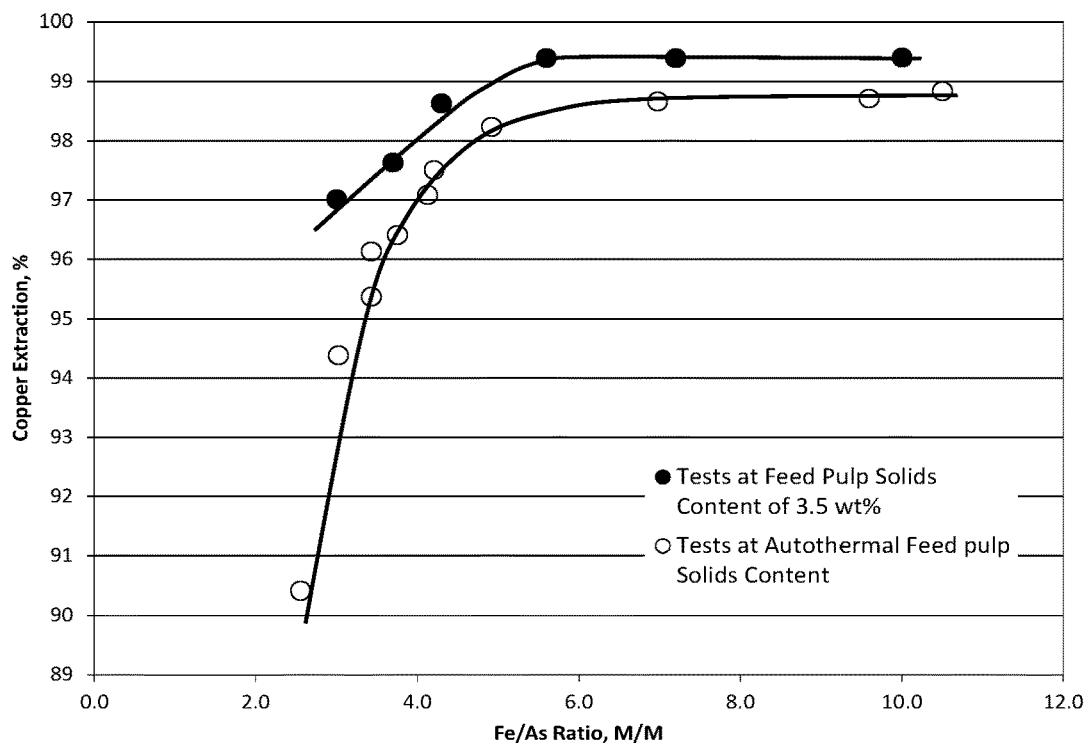

Previous studies operated under autothermal operation have shown a relationship between Fe:As mole ratio and the copper extraction to solution, with decreased copper extraction at lower Fe:As molar ratios, presumably due to the formation of insoluble Cu—As compounds rather than Fe—As compounds, and this is reflected in the curve for autothermal operations in FIG. 23. This loss of copper extraction makes processing feeds with low Fe:As mole ratios under autothermal operation undesirable.

However, FIG. 23 also shows that, by operating at pulp solids contents significantly below those values corresponding with autothermal operation, the sensitivity of the copper extraction to the Fe:As mole ratio was significantly reduced, which allows the processing of feeds with lower Fe:As ratios while maintaining high copper extractions. For example, under autothermal conditions at an Fe:As mol ratio of 3:1, the copper extraction dropped to 94.4%, while, at 3.5 wt % solids, the copper extraction was 97%.

Figure 24:
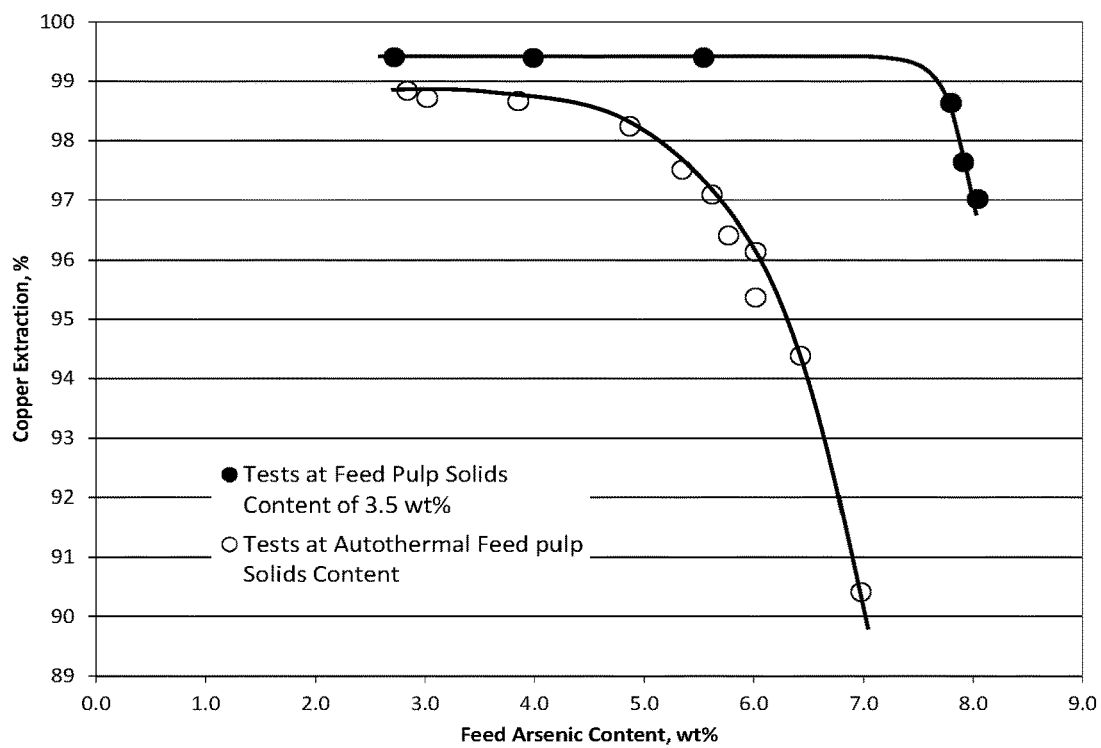

In similar fashion, FIG. 24 plots the results of the same tests as a function of feed arsenic content. Under autothermal conditions, the copper extraction dropped off rapidly at feed arsenic contents greater than 5 wt % As. At 3.5 wt % solids, a decrease was not observed until the feed arsenic content was over 7.5 wt %. This shows that, by operating at pulp solids contents significantly below those values corresponding with autothermal operation, feeds with up to around 8 wt % arsenic can be treated according to the process with limited impact on copper extraction by the feed arsenic content. Thus, the formation of refractory Cu—As compounds is reduced at high feed arsenic contents.

On the basis of this example, it is evident that high arsenic feeds can be processed by the process of this disclosure with improved copper recovery, compared to operating at higher solids and acidity levels, and with feeds to the autoclave having a Fe:As ratio between about 2:1 and 10:1.

Example 5

As noted above, the target operating conditions for the low solids content in the pressure oxidative leaching step in order to maintain the free acid content at or below 30 g/L varies with the sulphide sulphur content of the feeds (liquid and solids) to the autoclave. The concentrates in the above examples had a sulphide sulphur content above 25 wt %. Based on calculations and test results, this sulphide content at solids levels below about 10 wt %, was only sufficient to provide less than 60%, such as less than 50%, of the heat required for the pressure oxidative leaching step (i.e., to maintain the temperature in the autoclave above about 200° C.). In accordance with the process of this disclosure additional heat is provided to the pressure oxidation step to maintain the temperature above about 200° C.

To arrive at target conditions for the feed pulp solids content for the process when operated with lower or higher sulphide content feeds (compared to the sulphide content of Examples 1-4), a range of historical data samples from pressure oxidative leaching testing were analyzed using a heat balance model.

Figure 25:
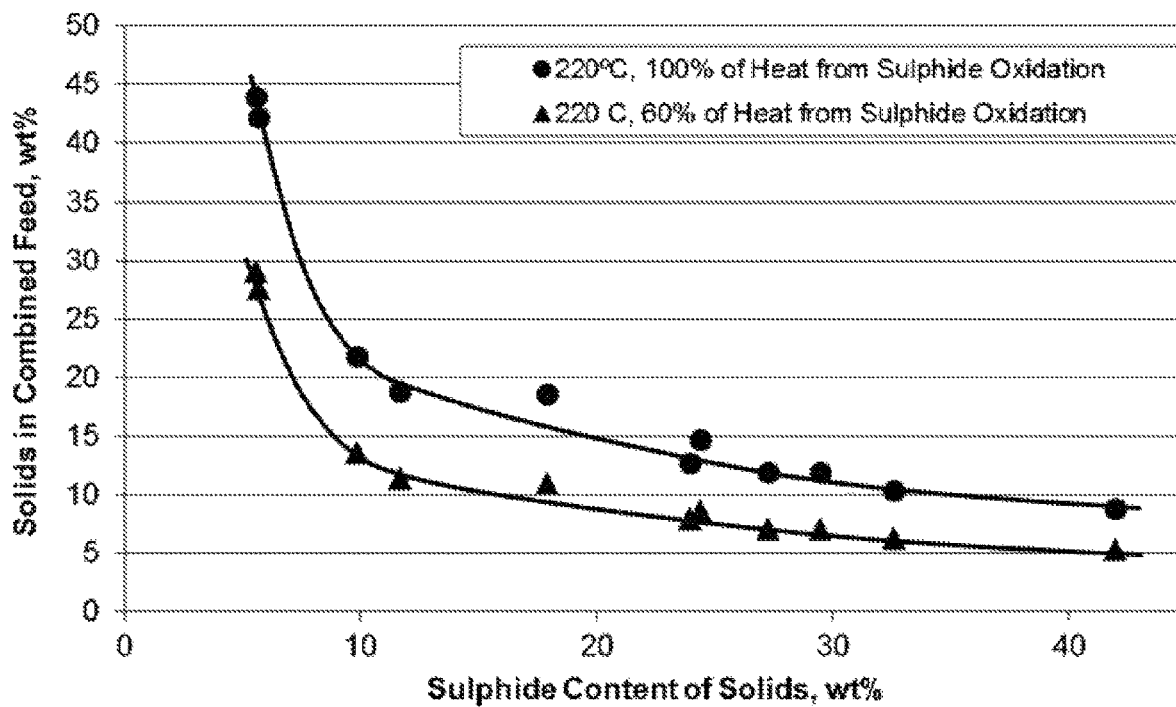
FIG. 25 is a graph showing heat balance modelling for solids content and sulphide sulphur content in sulphidic feeds. The Figure contrasts operating autothermally (top curve) with the solids and sulphide content providing 100% of the heat required to maintain an operating temperature of 220° C. by their chemical reaction (oxidation), for the pressure oxidative leaching step, and operating in accordance with the present disclosure (bottom curve) with the solids content and the sulphide sulphur content at or below 60% of that needed to provide the heat required for maintaining the pressure oxidative leaching step at target temperature, with the balance of the heat being provided, for example, as shown in the embodiments of FIGS. 3-7.

FIG. 25 shows two curves, plotting solids content in the combined liquid/solid feed to the autoclave against the sulphide content of the solids in the feed. The top curve is generated by performing a heat balance to determine the solids content of the combined feed slurry required for what the industry terms "autogenous" or "autothermal" operation, i.e., where 100% of the heat to maintain the operating temperature of 220° C. is provided by the oxidation of the sulphide materials. These calculations are based on using 20° C. quench or cooling water in the heat balance, which is within the normal industry operation of pressure oxidative leaching. This top curve is typical of heat balance data from prior art pressure oxidative leaching of sulphidic feeds, operated autothermally.

The bottom curve in FIG. 25 was generated by performing the same heat balance, but instead adjusting the temperature of the incoming "quench" or "cooling" water to a temperature where the oxidation of the sulphides provides only 60% of the heat to maintain the operating temperature of 220° C. The three data points on the furthest right of the bottom curve represent the materials from the above examples, with sulphide contents above 25 wt %. This bottom curve approximates the heat balance for the process of the present disclosure, where the solids content is sufficiently low to maintain the acidity at or below 30 g/L, and the remaining heat for the pressure oxidative leaching is added, for example with heated process water or steam to the autoclave, or by initially heating the feed to the autoclave. While the curves were generated for a target temperature of 220° C., the heat balance model can be modified for higher or lower temperatures. Similarly, the heat balance model can be used to generate a curve for target conditions to operate the process with the solids providing less than 60% of the heat for the pressure oxidation reaction, such as less than 50%.

Example 6

A copper concentrate with the composition set out in Table 4 was tested in a continuous pilot plant autoclave. Silver was not present in commercially appreciable quantities in this concentrate. Copper and iron were primarily present in the concentrate as enargite ($Cu_3AsS_4$) and pyrite ($FeS_2$), respectively. The Fe:As mol ratio for the concentrate was 4.34:1.

TABLE 4

| Feed Composition | | | | | | | | | |
|---|---|---|---|---|---|---|---|---|---|
| | | | | | | | | Analysis, g/t | |
| Al | As | Cu | Fe | Pb | Si | $S^{2-}$ | Zn | Au | Ag |
| 0.50 | 7.33 | 21.9 | 23.7 | 0.20 | 1.79 | 42.0 | 0.30 | 3.22 | 87 |

Figure 26:
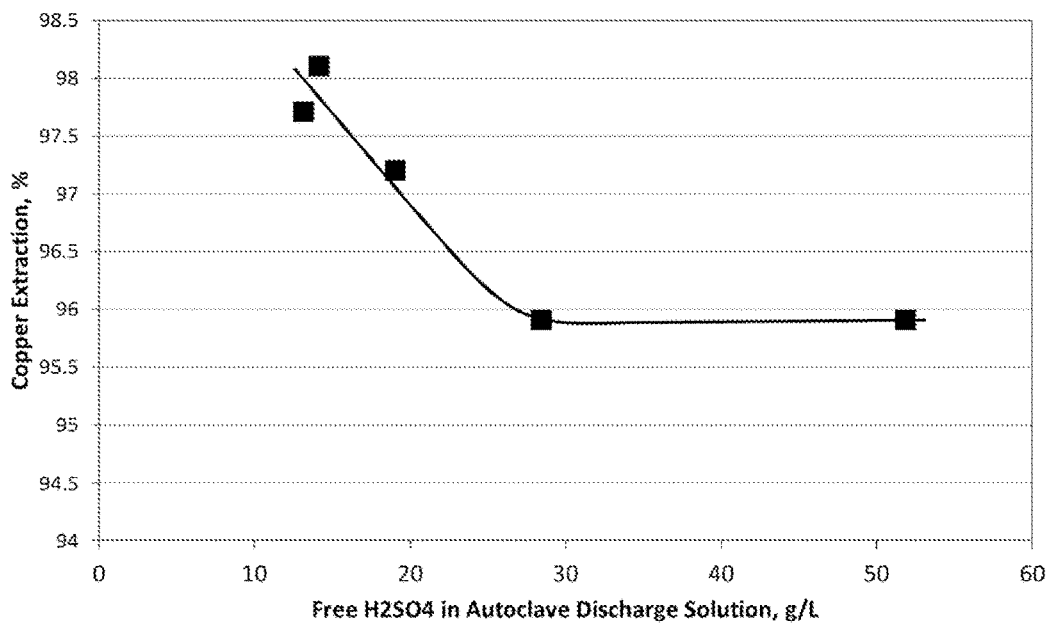
FIGS. 26-33 are graphs showing experimental results produced during piloting of the process of the disclosure with two different sulphidic feeds.

Pressure leaching was conducted at 220° C. and 2700 kPa(g) (500 kPa oxygen overpressure) with oxygen added to oxidize sulphide sulphur in the feed to sulphate, to leach copper into solution as copper sulphate and to precipitate arsenic from solution. Quench water containing 50 mg/L Ca, 10 mg/L K, 95 mg/L Na and 150 mg/L Cl was added to the autoclave at room temperature or after preheating in a shell and tube heat exchanger with steam. Table 5 shows the pressure leaching conditions tested. The copper extraction and acid concentrations from each operating period are presented in Table 5 and in FIG. 26.

TABLE 5

Pressure Leaching Conditions

| | Period Number | | | | |
|---|---|---|---|---|---|
| | 1 | 2 | 3 | 4 | 5 |
| Operating Conditions | | | | | |
| Aqueous Feed Slurry Solids Content, wt % | 8.8 | 4.0 | 2.5 | 1.75 | 1.75 |
| Heat from Sulphide Oxidation, % | 100 | 46 | 29 | 21 | 21 |
| Retention Time, min | 60 | 45 | 45 | 45 | 45 |
| Sulphide Oxidation, % | 99.1 | 99.3 | 98.9 | 98.2 | 98.3 |
| Copper Recovery to Solution, % | 95.9 | 95.9 | 97.2 | 98.1 | 97.7 |
| Copper in Autoclave Discharge, g/L | 19.8 | 9.84 | 5.63 | 3.88 | 3.84 |
| Free $H_2SO_4$ in Autoclave Discharge, g/L | 51.9 | 28.5 | 19.1 | 14.2 | 13.2 |

The high arsenic content of this concentrate affected the recovery of copper to solution when operating under autothermal conditions in Period 1 (i.e., with the chemical reaction of the solids and sulphide content providing 100% of the heat required to maintain the operating temperature of 220° C.) negatively, at only 95.9%. Lowering the aqueous feed solids content to lower the free acid concentration to below 28.5 g/L $H_2SO_4$ in the liquid phase increased the copper recovery to solution by 1.3 to 2.2%.

Figure 27:
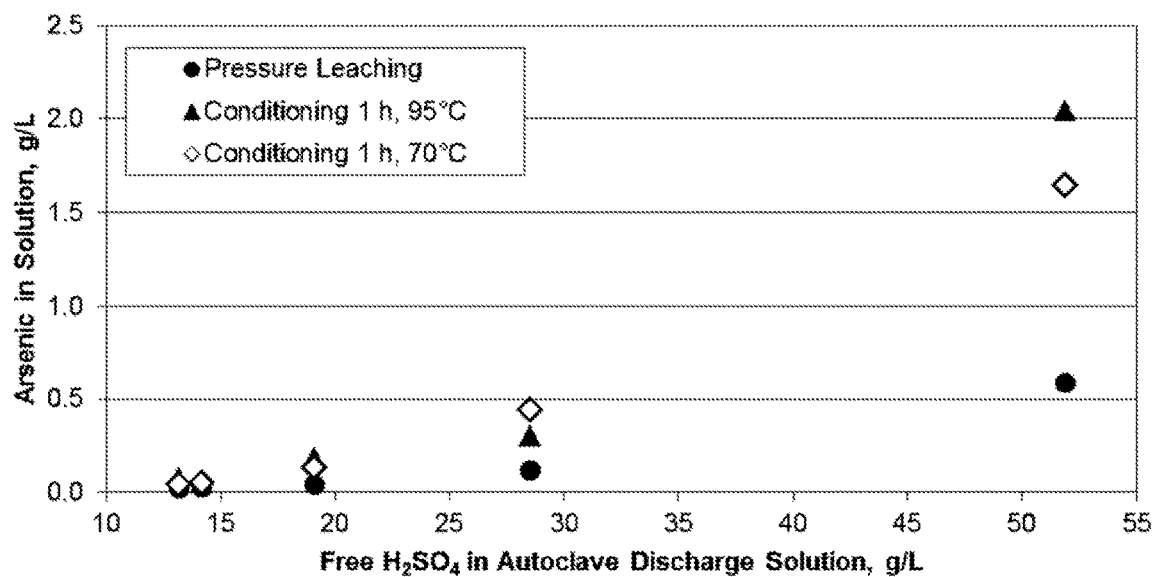

As shown in FIG. 27, operating at lower aqueous feed slurry solids content to produce lower free acid concentrations reduced the levels of arsenic in solution and the extent of redissolution experienced with extended times in contact with hot pressure leach solution. At free acid concentrations of less than 30 g/L $H_2SO_4$, arsenic in solution was reduced to below 0.25 g/L after pressure leaching and below 0.5 g/L following conditioning of the pressure leach slurry for 1 hour at both 75 and 90° C., and filtration.

Figure 28:
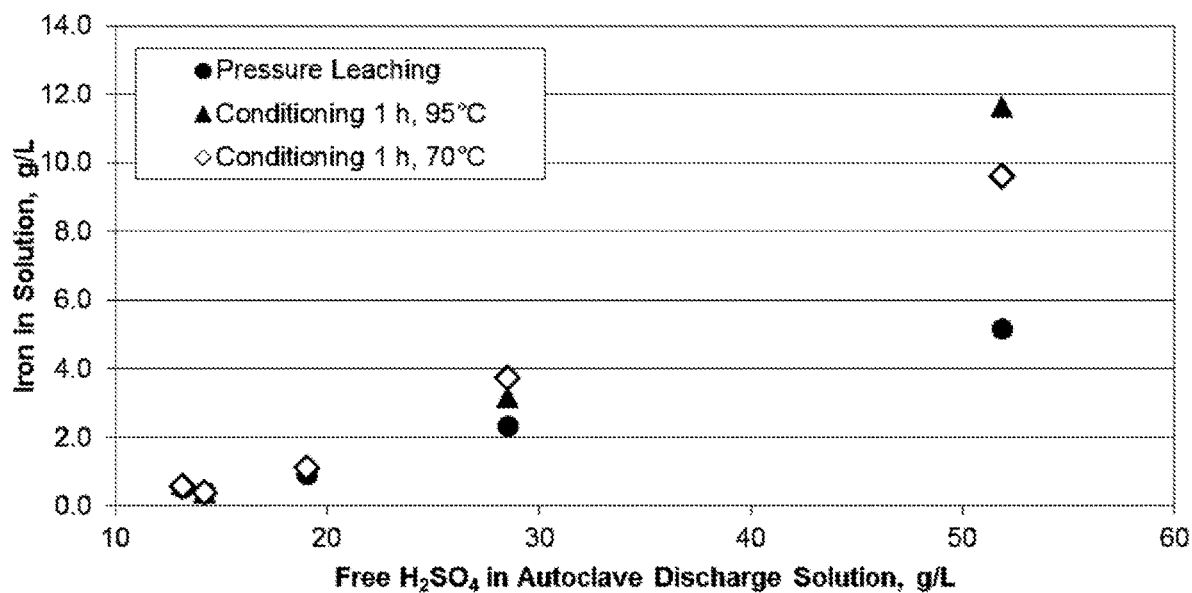

As shown in FIG. 28, the iron concentration in solution also dropped dramatically as the free acid concentration in the autoclave solution decreases, resulting in solutions with low levels of dissolved iron. The amount of redissolution with extended times in contact with hot pressure leach solution also decreases with lower solution acidity, with almost no redissolution of iron below 28 g/L $H_2SO_4$.

Figure 29:
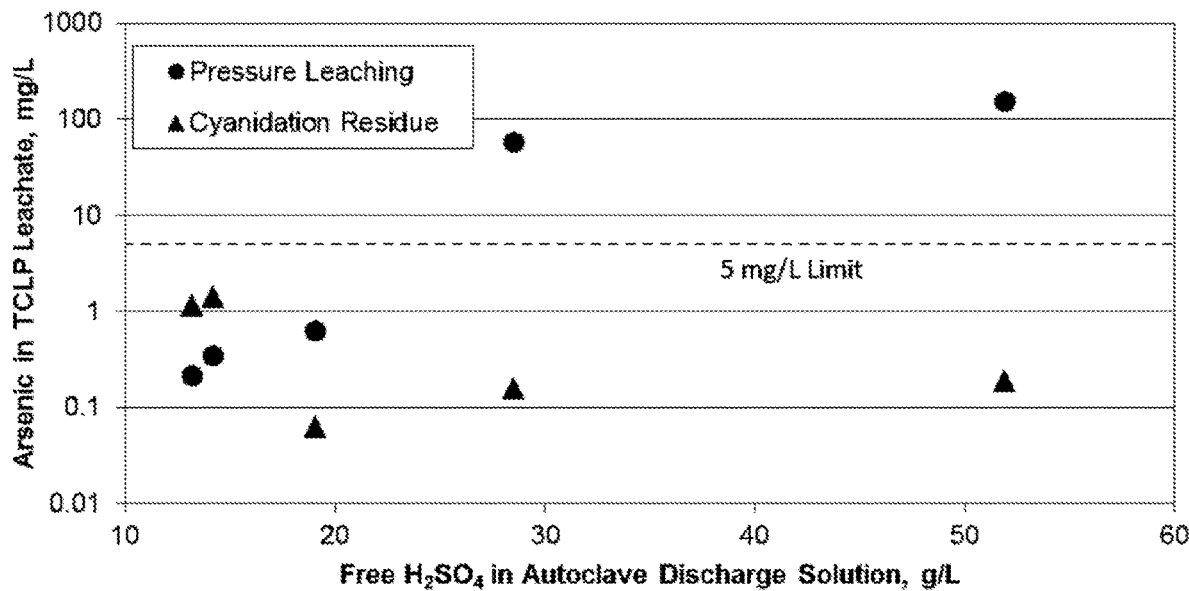

The pressure leach residues generated were tested for environmental stability by subjecting them to the US EPA TCLP test procedure. The maximum allowable limit for arsenic in the TCLP leachate is 5 mg/L. Arsenic concentration in the TCLP leachates for testing of the pressure leach residues and the cyanidation residues are provided in FIG. 29. Concentrate 1 did not produce environmentally stable pressure leach residues when treated by pressure leaching under autothermal conditions. Decreasing the aqueous feed slurry solids contents to produce a free acid concentration of 19.1 g/L improved the stability of the pressure leach residue, allowing the solids to pass the TCLP test. Residue stability for the cyanidation residue was below the TCLP limit for all of the samples tested.

Example 6 establishes, for a high arsenic feed, operating at reduced aqueous feed slurry solids contents to give reduced free acid concentrations in solution results in higher copper recoveries to solution and pressure leach residues with improved residue stability, passing the TCLP test with low levels of dissolved arsenic compared to very high levels from residues produced under autothermal conditions.

Example 7

A copper concentrate with the composition set out in Table 6 was tested in a continuous pilot plant autoclave. Copper was primarily present in the concentrate as chalcopyrite ($CuFeS_2$) and enargite ($Cu_3AsS_4$) and pyrite ($FeS_2$) was also present in significant quantity. The Fe:As mole ratio in this concentrate was 11.0:1.

TABLE 6

Feed composition

| | | | | | | | | | Analysis, g/t |
|---|---|---|---|---|---|---|---|---|---|
| Al | As | Cu | Fe | Pb | Si | $S^{2-}$ | Zn | Au | Ag |
| 1.07 | 2.63 | 30.3 | 21.6 | 0.43 | 2.80 | 33.6 | 3.05 | 1.57 | 469 |

Figure 30:
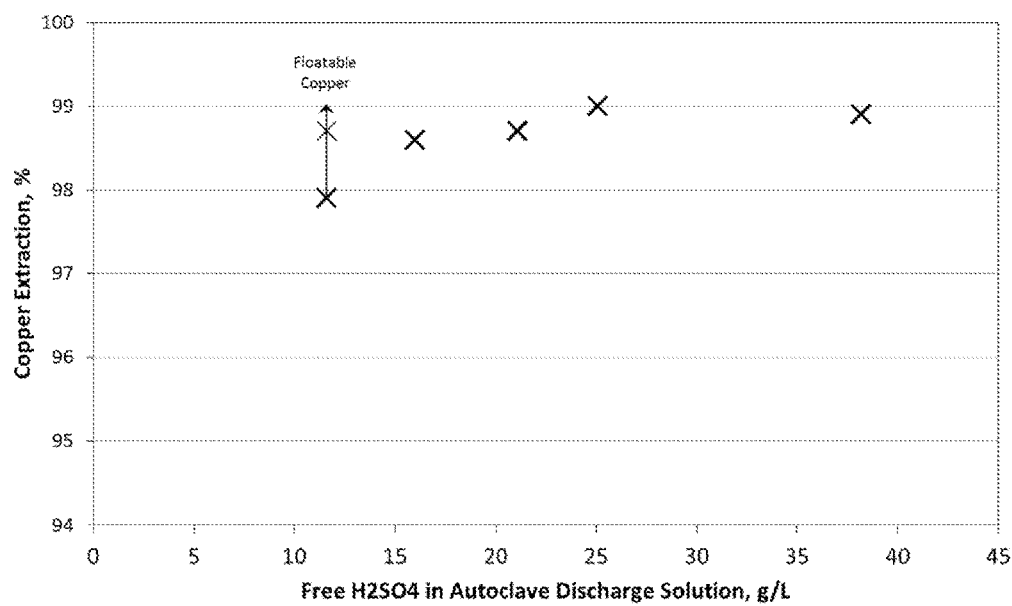

Pressure leaching was conducted at 220° C. and 2700 kPa(g) (500 kPa oxygen overpressure) with oxygen added to oxidize sulphide sulphur in the feed to sulphate, to leach copper into solution as copper sulphate and to precipitate arsenic from solution. Quench water containing 50 mg/L Ca, 10 mg/L K, 95 mg/L Na and 150 mg/L CI was added to the autoclave at room temperature or after preheating in a shell and tube heat exchanger with steam. The following table shows the pressure leaching conditions tested. The copper extraction and acid concentrations from each operation period are presented in Table 7 and in FIG. 30.

TABLE 7

Pressure Leach Conditions

| | Period Number | | | | |
|---|---|---|---|---|---|
| | A | B | C | D | E |
| Operation Conditions | | | | | |
| Aqueous Feed Slurry Solids Content, wt % | 10.3 | 6.0 | 4.5 | 3.75 | 3.0 |
| Heat from Sulphide Oxidation, % | 100 | 58 | 44 | 47 | 29 |
| Retention Time, min | 60 | 45 | 45 | 45 | 45 |
| Sulphide Oxidation, % | 99.1 | 99.2 | 98.7 | 98.6 | 97.8 |
| Copper Recover, % | 98.9 | 99.0 | 98.7 | 98.6 | 98.7 |
| Recovery to Solution, % | 98.9 | 99.0 | 98.7 | 98.6 | 97.9 |
| Recovery to Flotation Concentrate, % | — | — | — | — | 0.8 |
| Copper in Autoclave Discharge, g/L | 30.8 | 18.1 | 14.3 | 11.2 | 8.25 |
| Free $H_2SO_4$ in Autoclave Discharge, g/L | 38.2 | 25.1 | 21.1 | 16 | 11.6 |

Due to the lower arsenic content of this concentrate, there was little difference in copper recovery to solution between operating under "autothermal" conditions in Period A and operating at lower aqueous feed slurry solids contents and free acid concentrations in solution until Period E.

Pressure leach residue from Period E that had been thickened, filtered and washed to produce a wet filter cake was treated with froth flotation in a Denver flotation cell to produce a rougher concentrate. For the flotation test, a quantity of wet cake corresponding to about 0.5 kg of dry solids was placed in the flotation cell and water was added to adjust the slurry level above the level of the flotation rotor shaft inlet openings, to a pulp density of 20 to 25 wt % solids. The resulting pulp was adjusted to about pH 4, using 1:1 sulphuric acid solution. The pulp was then conditioned with additions of 150 g/t AERO XD-702, added as a 50 g/L solution, as a collector, and 50 g/t OREPREP F549, as a frother.

Each flotation test started when the air inlet into the rotor shaft was opened, and the rotor speed was increased to generate a non-overflowing froth layer of about 2 cm in depth. Flotation proceeded for ten minutes, using a spatula to collect froth at about 20 s intervals.

The resulting flotation concentrate contained 7.4% Cu, 21.9% S and 1884 g/t Ag, which corresponded to 40% of the residual copper and 20% of the silver in the residue, to give a total copper recovery (leaching+flotation) of 98.7%.

Figure 31:
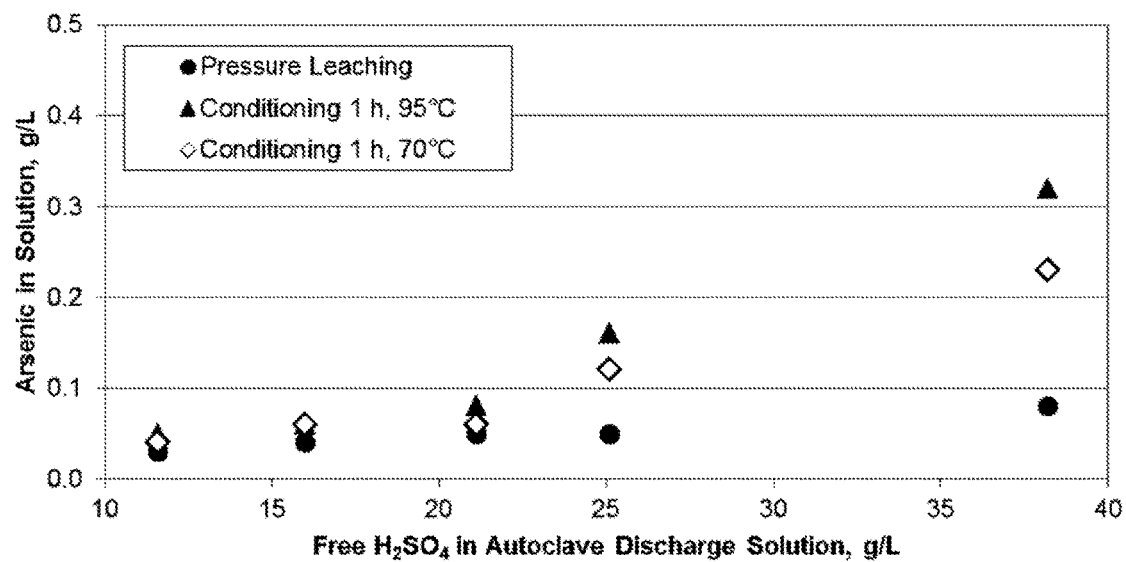

As shown in FIG. 31, the low arsenic content of Concentrate 2 meant that the arsenic concentrations in solution were low, even under autothermal conditions (i.e., less than 0.1 g/L As after pressure leaching, and 0.32 g/L As after 1 h of conditioning at 95° C. and filtration). However, operating at lower aqueous feed slurry solids contents and lower free acid concentrations significantly further reduced the levels of arsenic in solution and the extent of arsenic redissolution with prolonged times at elevated temperatures.

Figure 32:
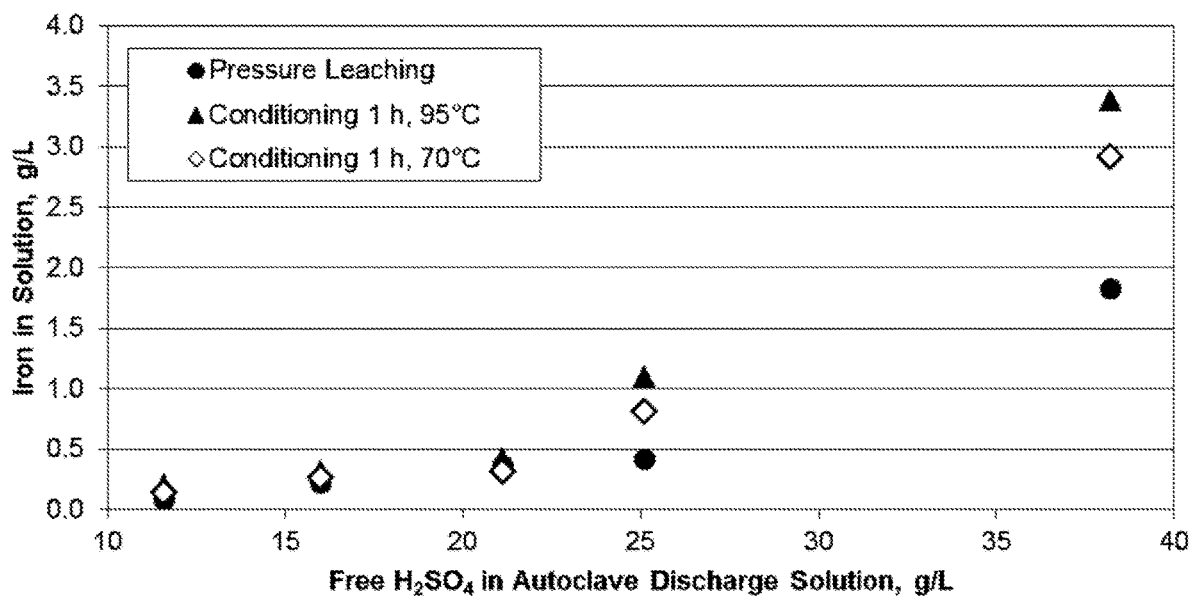

As shown in FIG. 32, the iron concentration in solution also drops dramatically as the free acid concentration in the autoclave solution decreases, resulting in solutions with very low levels of dissolved iron. The amount of redissolution with extended times in contact with hot pressure leach solution also decreases with lower solution acidity, with almost no iron redissolution at free acid levels below 25 g/L $H_2SO_4$.

Figure 33:
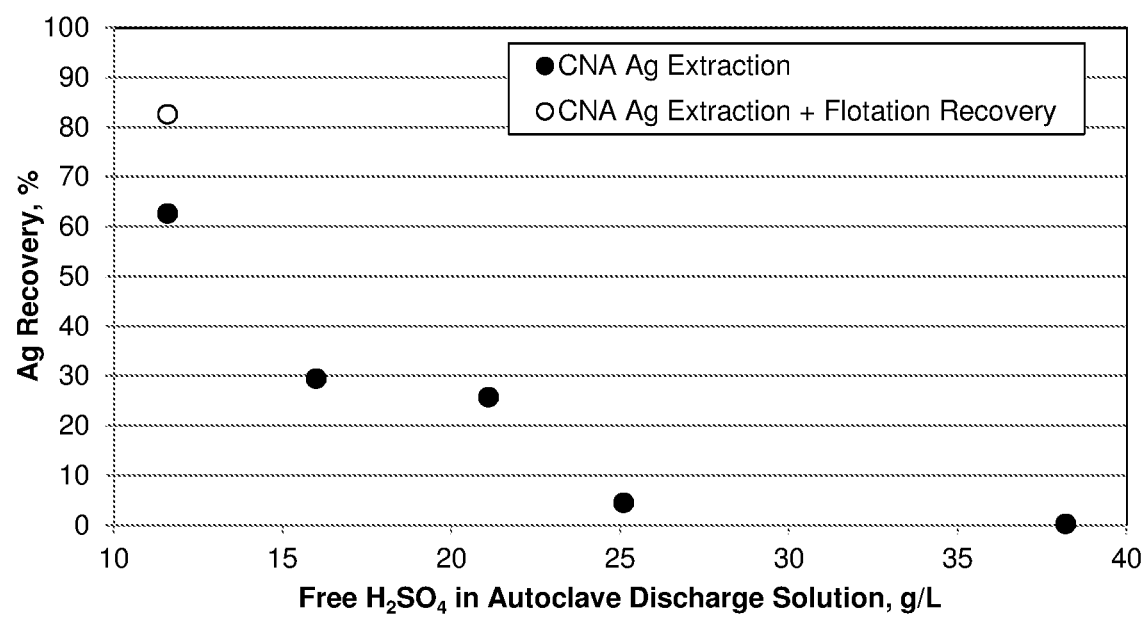

Small scale cyanidation tests were performed directly on selected samples of the autoclave pressure leach residue without pretreating the solids in a lime boil step. For each cyanidation test, water was added to produce a slurry containing approximately 30 to 50 g/L solids, and then the solids were leached for 24 h at pH 10.8 in the presence of 3 g/L NaCN. As shown in the FIG. 33, essentially no silver is recovered by direct cyanidation of pressure leach residue when the pressure leach is operated under "autothermal" conditions. However, at lower free acid concentrations of 25 g/L or lower, the silver in the pressure leach residue becomes more amenable to leaching by direct cyanidation. At the lowest free acid concentration tested, roughly 62% of the silver could be recovered by direct cyanidation of the pressure leach residue. Froth flotation of the pressure leach residue showed that, in Period E, an additional 20% of the silver in the pressure leach residue could be recovered to a rougher concentrate by froth flotation and roughly 62% by direct cyanidation of the flotation tailings, for a total silver recovery in Period E of over 80%.

Due to the low arsenic content of the concentrate feed, stable residues were produced throughout, with arsenic concentrations in TCLP leachate below 0.2 mg/L for the pressure leach residues and less than 0.7 mg/L for the cyanidation residues.

Example 7 establishes that, for a feed having commercially appreciable silver, but low arsenic levels, silver extraction by direct cyanidation increases by up to 62.5% when operating at lower free acid levels (lowest solution acidity tested), compared to operating at autothermal acid levels. Overall silver recoveries can be further improved by treating the pressure leach residue via froth flotation to recover a concentrate containing copper, sulphur and silver.

The experimental conditions set out above are exemplary only and the process may be practised under other conditions without departing from the invention.

The word "comprising" is used in its non-limiting sense to mean that items following the word in the sentence are included and that items not specifically mentioned are not excluded. The use of the indefinite article "a" in the claims before an element means that one of the elements is specified, but does not specifically exclude others of the elements being present, unless the context clearly requires that there be one and only one of the elements.

All publications mentioned in this specification are indicative of the level of skill of those skilled in the art to which this invention pertains. All publications are herein incorporated by reference to the same extent as if each individual publication was specifically and individually indicated to be incorporated by reference.

The terms and expressions used herein are used as terms of description and not limitation. There is no intention, in using such terms and expression of excluding equivalents of the features shown and described, it being recognized that the scope of the invention is defined and limited only by the claims.

We claim:

1. A process for recovering one or both of copper and silver from a sulphidic feed containing iron, arsenic, copper and silver, comprising:
   a) pressure oxidizing an aqueous feed slurry of the sulphidic feed in a pressure vessel to form a liquid phase containing free sulphuric acid and aqueous copper sulphate, and to precipitate arsenic as solid iron arsenic compounds, while operating the pressure vessel at a solids content in the aqueous feed slurry such that:
      i. a free acid level below 30 g/L is maintained in the liquid phase,
      ii. heat generated by oxidizing the aqueous feed slurry provides less than 60% of the heat to the pressure vessel, and
      iii. the sulphide level in the aqueous feed slurry is below 2.5 wt %,
   wherein the solids content is maintained by adding one or more of process water, steam and a feed slurry to the pressure vessel as part of the aqueous feed slurry,
   wherein one or more of a heated feed slurry, a heated process water and steam is added to the pressure vessel as part of the aqueous feed slurry; and
   wherein temperature in the pressure vessel is maintained above 200° C.;
   b) withdrawing from the pressure vessel treated slurry comprising a liquid phase containing sulphuric acid and copper sulphate, and solids containing iron arsenic compounds and at least a portion of the silver;
   c) separating the liquid phase from the solids; and one or both of
   d) recovering copper metal from the separated liquid phase; and
   e) recovering silver from the solids by cyanide leaching.

2. The process of claim 1, wherein:
   the sulphidic feed contains greater than 10 wt % copper, and an arsenic content above 0.5 wt %,
   step a) is operated at a solids content to maintain the free acid level below 27 g/L; and
   the method includes step d).

3. The process of claim 2, wherein:
   the sulphidic feed contains greater than 100 g/t silver;
   step a) is operated at a solids content to maintain the free acid level below 27 g/L; and
   the method includes step e) without a jarosite destruction step.

4. The process of claim 3, wherein step a) is operated at a solids content to maintain the free acid level between 5 and 25 g/L.

5. The process of claim 4, wherein:
the aqueous feed slurry of step a) has a Fe:As mole ratio between 2:1 and 10:1; and
the method includes step d).

6. The process of claim 2, wherein step a) is operated at a solids content to maintain the free acid level between 5 and 25 g/L.

7. The process of claim 6, wherein:
the aqueous feed slurry of step a) has a Fe:As mole ratio between 2:1 and 10:1; and
the method includes step d).

8. The process of claim 1, wherein: the sulphidic feed contains greater than 100 g/t silver;
step a) is operated at a solids content to maintain the free acid level below 27 g/L; and
the method includes step e) without a jarosite destruction step.

9. The process of claim 8, wherein step a) is operated at a solids content to maintain the free acid level between 5 and 25 g/L.

10. The process of claim 1, wherein the sulphide content in the feed is greater than 25 wt %.

11. The process of claim 10, wherein the sulphide content in the feed is greater than 25 wt %, and the solids content in step a) is below 10 wt % solids.

12. The process of claim 10, wherein the sulphide content in the feed is greater than 25 wt %, and the solids content in step a) is below 6 wt % solids.

13. The process of claim 1, wherein the pressure vessel is an autoclave, and the temperature of the autoclave is maintained between 200 and 230° C.

14. The process of claim 1, wherein step b) further comprises recovering heat or steam from the treated slurry and/or from a pressure letdown or flashing step, and using that heat or steam to supply at least a portion of the heat provided in step a).

15. The process of claim 14, wherein the heat recovery includes passing the treated slurry through a direct or indirect heat exchanger before step c) and using that heat to heat one or both of the process water and the feed slurry.

16. The process of claim 1, wherein the pressure vessel is operated at a partial pressure of oxygen between 200 and 1000 kPa, and wherein the retention time in the pressure vessel is between 20 and 60 minutes.

17. The process of claim 1, providing:
i. stable solids from step c);
ii. stable solids from step e); and
iii. arsenic in the liquid phase in step b) less than 0.6 g/L, and in the liquid phase in step c) less than 1 g/L.

18. The process of claim 1, providing:
i. more than 95% of sulphidic sulphur in the feed converted to sulphates; and
ii. less than 5% of sulphidic sulphur in the feed converted to elemental sulphur in the solids.

19. The process of claim 1, without neutralizing the free acid produced during step a) and without neutralizing the free acid subsequent to step a).

20. The process of claim 1, wherein the feed includes an arsenical material generated from pyrometallurgical treatment of an arsenic-containing sulphidic material, one or both of roaster dust and a roaster calcine from a pyrometallurgical treatment of a copper ore or concentrate, or process water added to step a) contains arsenic.

21. The process of claim 1, wherein the sulphidic feed includes one or more of a sulphidic ore, a sulphidic concentrate and a sulphide-containing solid.

22. The process of claim 1, further comprising one or both of: subjecting the solids from step c) to froth flotation to recover one or both of unleached copper and silver sulphides as a sulphide concentrate; and
subjecting the solids from step e) to froth flotation to recover one or both of unleached copper and silver sulphides as a sulphide concentrate.

23. The process of claim 1, wherein the solids content in step a) is such that the heat generated by oxidizing the sulphidic feed provides less than 50% of the heat to the pressure vessel in step a).

24. The process of claim 1, the solids content in step a) is such that the sulphide level in the aqueous feed slurry is below 2 wt %.

25. The process of claim 1, wherein the pressure vessel is an autoclave, and the temperature of the autoclave is maintained between 210 and 230° C.

* * * * *